(12) United States Patent
Kusumoto

(10) Patent No.: US 10,956,641 B2
(45) Date of Patent: Mar. 23, 2021

(54) ANALYSIS DEVICE, ANALYSIS METHOD, AND STORAGE MEDIUM WHICH STORES PROGRAM

(71) Applicant: NEC Corporation, Tokyo (JP)

(72) Inventor: Manabu Kusumoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 288 days.

(21) Appl. No.: 16/086,054

(22) PCT Filed: Mar. 17, 2017

(86) PCT No.: PCT/JP2017/010829
§ 371 (c)(1),
(2) Date: Sep. 18, 2018

(87) PCT Pub. No.: WO2017/169875
PCT Pub. Date: Oct. 5, 2017

(65) Prior Publication Data
US 2020/0293708 A1   Sep. 17, 2020

(30) Foreign Application Priority Data

Mar. 28, 2016   (JP) .............................. JP2016-064103

(51) Int. Cl.
*G06F 30/367* (2020.01)
*G06F 30/20* (2020.01)
(Continued)

(52) U.S. Cl.
CPC ............ *G06F 30/367* (2020.01); *G06F 30/18* (2020.01); *G06F 30/20* (2020.01); *E03B 1/00* (2013.01);
(Continued)

(58) Field of Classification Search
USPC ....................................................... 716/111
See application file for complete search history.

(56) References Cited

U.S. PATENT DOCUMENTS

| 6,507,792 B1* | 1/2003 | Senoo | ................... F15B 19/007 |
| | | | 310/86 |
| 2011/0138391 A1* | 6/2011 | Cho | ....................... G06F 9/4881 |
| | | | 718/102 |

(Continued)

FOREIGN PATENT DOCUMENTS

| JP | H10-320444 A | 12/1998 |
| JP | 2001-117953 A | 4/2001 |

(Continued)

OTHER PUBLICATIONS

International Search Report for PCT Application No. PCT/JP2017/010829, dated Jun. 20, 2017.

(Continued)

*Primary Examiner* — Mohammed Alam

(57) ABSTRACT

The purpose of the present invention is to facilitate evaluating the precision of a pipe network model without using flow information. An analysis device according to an embodiment of the present invention comprises a transfer characteristic derivation unit which derives a transfer characteristic which represents a relation between a voltage in a plurality of nodes which are included in an electrical circuit which is a model of a pipe network through which a fluid flows and a voltage in an interior node which is a different node of the electrical circuit from the plurality of nodes, and a computation unit which, on the basis of the transfer characteristic and the pressure of the fluid at positions within the pipe network which correspond to the plurality of nodes, computes the pressure of the fluid at a position within the pipe network which corresponds to the interior node.

9 Claims, 14 Drawing Sheets

(51) Int. Cl.
*G06F 30/18* (2020.01)
*G06F 113/08* (2020.01)
*G06F 113/14* (2020.01)
*G06F 119/06* (2020.01)
*E03B 1/00* (2006.01)

(52) U.S. Cl.
CPC ...... *G06F 2113/08* (2020.01); *G06F 2113/14* (2020.01); *G06F 2119/06* (2020.01)

(56) References Cited

U.S. PATENT DOCUMENTS

2017/0308635 A1* 10/2017 Kusumoto .............. G06F 17/13
2019/0154637 A1*  5/2019 Kusumoto ................ F17D 5/00

FOREIGN PATENT DOCUMENTS

| JP | 2005-275558 A | 10/2005 |
| JP | 2009-282804 A | 12/2009 |

OTHER PUBLICATIONS

English translation of Written opinion for PCT Application No. PCT/JP2017/010829.

* cited by examiner

ANALYSIS DEVICE, ANALYSIS METHOD, AND STORAGE MEDIUM WHICH STORES PROGRAM

This application is a National Stage Entry of PCT/JP2017/010829 filed on Mar. 17, 2017, which claims priority from Japanese Patent Application 2016-064103 filed on Mar. 28, 2016, the contents of all of which are incorporated herein by reference, in their entirety.

TECHNICAL FIELD

The present disclosure relates to a technique for analyzing a pipe network in which fluid flows.

BACKGROUND ART

In recent years, a technique for properly managing a pipe network that is capable of transferring fluid such as a gas transportation network and water and sewerage network, and for managing the fluid transported by the pipe networks is desired.

For example, PTL 1 discloses a technique for replacing a pipe network with an electrical circuit network, and obtaining the flow amount and the like of the water pipe network using a current law and voltage law established on the formed electrical circuit network.

PTL 2 discloses a technique for increasing the precision of a plant model by comparing the estimation data of the plant and the estimation data acquired by simulation using the plant model.

CITATION LIST

Patent Literature

[PTL 1] Japanese Unexamined Patent Application Publication No. Hei 10-320444
[PTL 2] Japanese Unexamined Patent Application Publication No. 2009-282804.

SUMMARY OF INVENTION

Technical Problem

It is difficult to install a sensor for flow amount measurement directly in a pipe. A sensor using a supersonic wave and the like has a problem that it is difficult to capture the fast variation etc.

As a result, a method capable of evaluating the precision of the analysis model without using the information of the flow amount is desired.

The present invention has been made in view of the above problem, and one of the objectives of the present invention is to enable evaluating a model of a pipe network without using the information of flow amount.

Solution to Problem

An analysis device according to one aspect of the present invention includes: transfer characteristics derivation means for deriving a transfer characteristics that represents a relation between a voltage at a plurality of nodes included in an electrical circuit and a voltage at an interior node that is a node in the electrical circuit different from the plurality of nodes, the electrical circuit being a modeling of a pipe network in which fluid flows; and computation means for computing a pressure of the fluid at a position in the pipe network corresponding to the interior node, based on the transfer characteristics and pressures of the fluid at positions in the pipe network corresponding to the plurality of nodes.

An analysis method according to one aspect of the present invention includes: deriving a transfer characteristics that represents a relation between a voltage at a plurality of nodes included in an electrical circuit and a voltage at an interior node that is a node in the electrical circuit different from the plurality of nodes, the electrical circuit being a modeling of a pipe network in which fluid flows; and computing a pressure of the fluid at a position in the pipe network corresponding to the interior node, based on the transfer characteristics and pressures of the fluid at positions in the pipe network corresponding to the plurality of nodes.

A program according to one aspect of the present invention causes a computer to perform: transfer characteristics derivation processing for deriving a transfer characteristics that represents a relation between a voltage at a plurality of nodes included in an electrical circuit and a voltage at an interior node that is a node in the electrical circuit different from the plurality of nodes, the electrical circuit being a modeling of a pipe network in which fluid flows; and computation processing for computing a pressure of the fluid at a position in the pipe network corresponding to the interior node, based on the transfer characteristics and pressures of the fluid at positions in the pipe network corresponding to the plurality of nodes.

Advantageous Effects of Invention

With the present invention, precision of a model of a pipe network can be evaluated without using information of flow amount.

EXAMPLE EMBODIMENT

Figure 1:
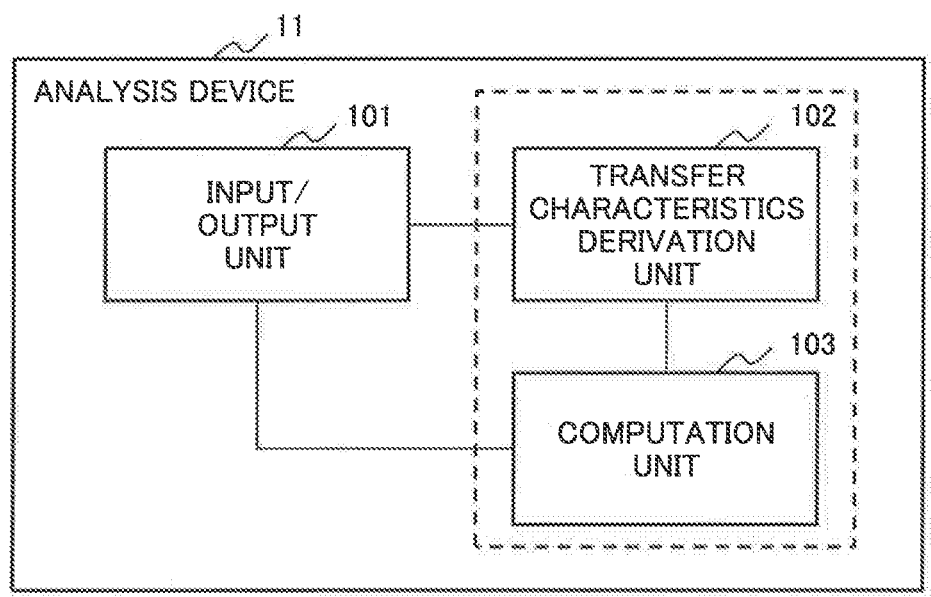
FIG. 1 is a block diagram illustrating a configuration of an analysis device according to the first example embodiment of the present invention.

Matters related to the present disclosure is described.

In a water pipe network, managing components constituting the water pipe network by observing the state of components such as a water distributing pipe (a pipe-shaped fluid pipe, hereinafter sometimes referred to as "pipe"), various valves, a tank and the like, i.e., the pipe management, is important. The pipe management includes prevention of a fault such as breakage, deterioration measure and the like in a component constituting the pipe network.

In a water pipe network, an appropriate water distribution control by observing the state of fluid (for example, amount of water, water pressure and the like) is required. The water distribution control includes prevention of damage of pipe network by a sudden change of water pressure, maintaining an appropriate water pressure at the water supply point, and measure against sudden change of the water supply amount and the demanded amount and the like.

For the above-described pipe management or water distribution control, a technique of analyzing the state of a component constituting the pipe network (for example, a pipe, a tank, a valve and the like) and the fluid transported in the pipe network is required.

For example, by installing various sensors in a pipe network, observing the status of the component constituting the pipe network and the fluid transported in the pipe network is possible. However, installing numerous sensors to a large-scale pipe network is not always realistic from the viewpoints of cost and man-hours required for installation.

One of the possible methods of suppressing the number of sensors at the same time observing the state of the fluid transported in the pipe network is to model the pipe network and the fluid transported in the pipe network, and to analyze by simulation.

In an analysis of the fluid flowing in the pipe network by simulation, the analysis model for simulation (information of pipe network) is generally generated from design data and measurement. However, due to the error in designing data, measurement error or the deterioration of the pipe network, there are cases that a gap between the behavior of the fluid on the basis of the analysis model and the actual behavior of the fluid flowing in the pipe network is generated. Therefore, for a more precise analysis, evaluating the analysis model and modifying by comparing the actual measurement and the simulation is important.

Generally, comparing a result of the simulation using the analysis model to the fluid flowing in the pipe network with actual measurement data is considered as a method for evaluating the analysis model. In this case, in order to simulate the flow of the fluid, the behavior of the fluid that flows into an end part of the simulation area, or the behavior of the fluid flows from the end part is necessary to be expressed. In order to express the behavior of the fluid at the end part, it is necessary to know the flow amount and the pressure of the fluid at the end part.

Hereinafter, with reference to the figures, the example embodiments of the disclosed subject matter are described in detail. The configurations described in the example embodiments are merely an example, and the scope of the present invention is not limited to the configurations.

The analysis device described in each example embodiment may be achieved by a dedicated hardware. The analysis device may be configured as a system in which one or more component constituting the analysis device is achieved using one or more physical or logical information processing apparatus (physical computer, imaginary computer or the like).

In the following description, the analysis target is assumed to be a water pipe network that transports (delivers) water. However, the present invention described with the example embodiment as an example is not limited to the description, but applicable to a pipe network in which arbitrary fluid other than water flows. For example, the fluid may be liquid other than water, or a gaseous body such as natural gas.

First Example Embodiment

<Configuration>

The first example embodiment of the present invention is described. FIG. 1 is a block diagram illustrating a configuration of an analysis device 11 according to the first example embodiment of the present invention.

The analysis device 11 includes an input/output unit 101, a transfer characteristics derivation unit 102 and a computation unit 103.

The input/output unit 101 exchanges data with the outside. The input/output unit 101 may have an interface with which a user can input data thereto and view data, for example. The input/output unit 101 may be coupled with a storage medium that can store data. The input/output unit 101 may be connected to an output device having a display function.

The input/output unit 101 also exchanges data with each component of the analysis device 11.

For example, the input/output unit 101 supplies information of a pipe network to the transfer characteristics derivation unit 102. The information of the pipe network is, for example, information that is used by a user to perform a simulation of fluid flowing in the pipe network, for example. Specifically, the information of the pipe network includes information such as a linkage relationship of pipes constituting the pipe network, length, diameter, material, roughness and the like, for example. The information of material and the roughness may be described with a flow coefficient, for example.

The input/output unit 101 supplies designation of an area that is an target of analysis by the analysis device 11 and designation of interior points existing inside the area to the transfer characteristics derivation unit 102. The input/output unit 101 may acquire, as designation of the area that is the target of analysis, designation of points defining the area (i.e. an end point of the pipe network within the area). Hereinafter, a point(s) defining the area that is the target of analysis is written as an "end point(s)".

The input/output unit 101 may acquire information of the pipe network and designation of the area and the interior point according to the input by a user. Alternatively, the input/output unit 101 may acquire the above information and the above designation by reading out the data stored on a storage device that is not illustrated in the drawings.

The input/output unit 101 may supply information about the pressure of fluid flowing at the end point to the transfer characteristics derivation unit 102. For example, the input/output unit 101 may supply information showing a range in which the pressure of fluid flowing at the end point changes. The information may be used to derive the transfer characteristics by the transfer characteristics derivation unit 102, described later.

The input/output unit 101 supplies information about a water pressure at the end point in the pipe network to the computation unit 103. The pressure information is water pressure values measured at points respectively equivalent to one of end points of the pipe network, for example.

The transfer characteristics derivation unit 102 derives the transfer characteristics on the basis of an end point and an interior point designated by the input/output unit 101, on the basis of the information of the pipe network supplied from the input/output unit 101. The transfer characteristics is a value or a set of values showing the relation between the voltage and the current at a plurality of terminals in an electrical circuit network. In other words, the transfer characteristics derivation unit 102 derives the transfer characteristics related to a terminal equivalent to the designated end point or the interior point in a situation where the pipe network is modeled with an electrical circuit network.

Modeling the pipe network with an electrical circuit network is to make (or assume) a model of the electrical circuit network that can simulate the state of fluid flowing in the pipe network by associating the flow amount of fluid with the current and associating the pressure with the voltage. The current in the modeled electrical circuit network and the flow amount of fluid flowing in the pipe network can be converted to each other. Moreover, the voltage in the modeled electrical circuit network and the pressure of fluid flowing in the pipe network can be converted to each other.

The transfer characteristics derivation unit 102 derives, as the transfer characteristics on the basis of the end point and the interior point, a coefficient of an equation that relates the voltage and the current at a terminal corresponding to the end point and a terminal corresponding to the interior point.

For example, the transfer characteristics derivation unit 102 firstly models the state of the pipe network in the designated area by replacing with an electrical circuit network, and simulates the behavior of the electrical circuit. The transfer characteristics derivation unit 102 derives, on the basis of the simulation, the relation between the voltage and the current between a terminal (node) corresponding to the end point designated by the input/output unit 101 and a terminal (node) in the electrical circuit network corresponding to the interior point as the transfer characteristics.

The transfer characteristics may be described with a matrix in the following equation, for example.

[Math 1]

$$\begin{bmatrix} I_1 \\ \vdots \\ I_n \end{bmatrix} = \begin{bmatrix} Y_{11} & \cdots & Y_{1n} \\ \vdots & \ddots & \vdots \\ Y_{n1} & \cdots & Y_{nn} \end{bmatrix} \begin{bmatrix} V_1 \\ \vdots \\ V_n \end{bmatrix} \quad (1)$$

Here, the $I_k$ ($1<=k<=n$) is the current flows from outside of the electrical circuit network (or flowing to the outside of the electrical circuit network) at the k-th node (corresponding to a designated point), and $V_k$ is the voltage at the node k.

This matrix is generally referred to as an admittance matrix.

The admittance matrix can be used in an equation that enables obtaining the current flowing in from the outside of the electrical circuit network (or flowing to the outside of the electrical circuit network) using the voltage with respect to each node.

The admittance matrix can be calculated, on the basis of the modeled electrical circuit network and various electromagnetic laws, using an electrical circuit simulator such as Simulation Program with Integrated Circuit Emphasis (SPICE). The electrical circuit simulator may be, for example, a simulator using characteristic curve method, or a general simulator that can calculate the flow of the electricity using finite element method and/or particle method.

The transfer characteristics derivation unit 102 may calculate the admittance matrix by collaborating with the electrical circuit simulator that is not illustrated in the drawings. The electrical circuit simulator may be outside the analysis device 11. Alternatively, the transfer characteristics derivation unit 102 may have a function equivalent to the function of an electrical circuit simulator. The transfer characteristics derivation unit 102 sends, on the basis of the information of the pipe network supplied from the input/output unit 101, to the electrical circuit simulator the electrical circuit network that is the modeling of the pipe network and the designated points. And the transfer characteristics derivation unit 102 cause the electrical circuit simulator to calculate the admittance matrix. The transfer characteristics derivation unit 102 acquires the calculated admittance matrix as the transfer characteristics. As described above, the transfer characteristics derivation unit 102 derives the transfer characteristics shown in the equation (1), for example.

The transfer characteristics derivation unit 102 may not include an electrical circuit simulator, but may have a function necessary for calculating the admittance matrix.

In the equation (1), for example, the first to (n−1)th nodes are assumed to correspond to end points, and the n-th node is assumed to correspond to an interior point. In such a case, the transfer characteristics derivation unit 102 may derive only elements related to the current at the n-th node, i.e. $Y_{n1}$ to $Y_{nn}$, as the transfer characteristics.

The computation unit 103 computes the water pressure at the interior point on the basis of the transfer characteristics and the water pressure information at the end point of the pipe network supplied from the input/output unit 101.

The principle that the computation unit 103 is able to compute the water pressure at the interior point is as follows. In the following description, the n-th node is assumed to be the interior point the water pressure of which is the target of computation.

The equation (2) is derived from the equation (1).

[Math 2]

$$I_n = Y_{n1}V_1 + \ldots + Y_{n\,n-1}V_{n-1} + Y_{n\,n}V_n \quad (2)$$

In the equation (2), since the n-th node is a terminal corresponding to the interior point, current does not flow to the outside from the point. Therefore, $I_n$ is settable as $I_n=0$. Thus, by substituting $I_n=0$ in the equation (2) and solving for $V_n$, the following equation (3) is acquired.

[Math 3]

$$V_n = -\frac{Y_{n1}V_1 + \ldots + Y_{nn-1}V_{n-1}}{Y_{nn}} \quad (3)$$

The equation (3) is understood to be an equation to obtain the voltage at the n-th node that is the interior point from the voltage at a point other than n-th node. Therefore, on the basis of the equation (3), the computation unit 103 is able to compute $V_n$ when the values of $Y_{n1}$ to $Y_{nn}$, $V_1$ to $V_{n-1}$ are known.

Especially when the first to (n–1)th nodes correspond to end points, the $V_1$ to $V_{n-1}$ in the equation (3) are variables that can be obtained by transforming the water pressure at respective one of the end points. Therefore, the computation unit 103 is able to obtain the value of $V_n$ from the transfer characteristics ($Y_{n1}$ to $Y_{nn}$) and the water pressures at the end points. The computation unit 103 may obtain the $V_n$ and then transforms the obtained $V_n$ to water pressure. The transformed value represents a water pressure at the interior point. In this way, the computation unit 103 is able to obtain the water pressure at the interior point.

Note that the equation (3) can be modified without departing from the scope of the technical idea disclosed by the present example embodiment. For example, the equation (3) may be transformed to an equation that represents a relation between water pressure at the end point and water pressure at the interior point, on the basis of the correspondence between voltage and water pressure. Using the equation, the computation unit 103 may obtain the water pressure at the interior point directly from the water pressure at the end point.

The input/output unit 101 outputs the water pressure at the interior point computed by the computation unit 103.

<Operation>

The operation of the analysis device 11 according to the first example embodiment is described with examples.

Figure 2:
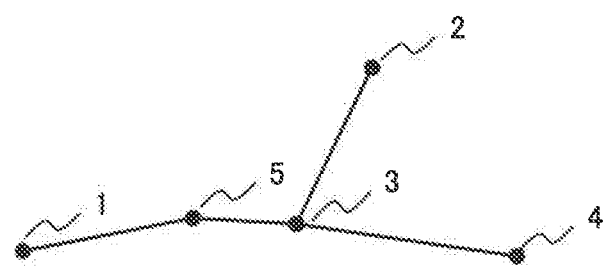
FIG. 2 is a conceptual diagram illustrating an example of a pipe network that is an analysis target by the analysis device according to the first example embodiment.

The target of the simulation and analysis is assumed to be a water pipe network illustrated in FIG. 2, for example. In the water pipe network, points 1, 2, and 4 are end points, and a point 5 is an interior point. A point 3 is a branching point, and is not involved directly to the equation in the description.

Figure 3:
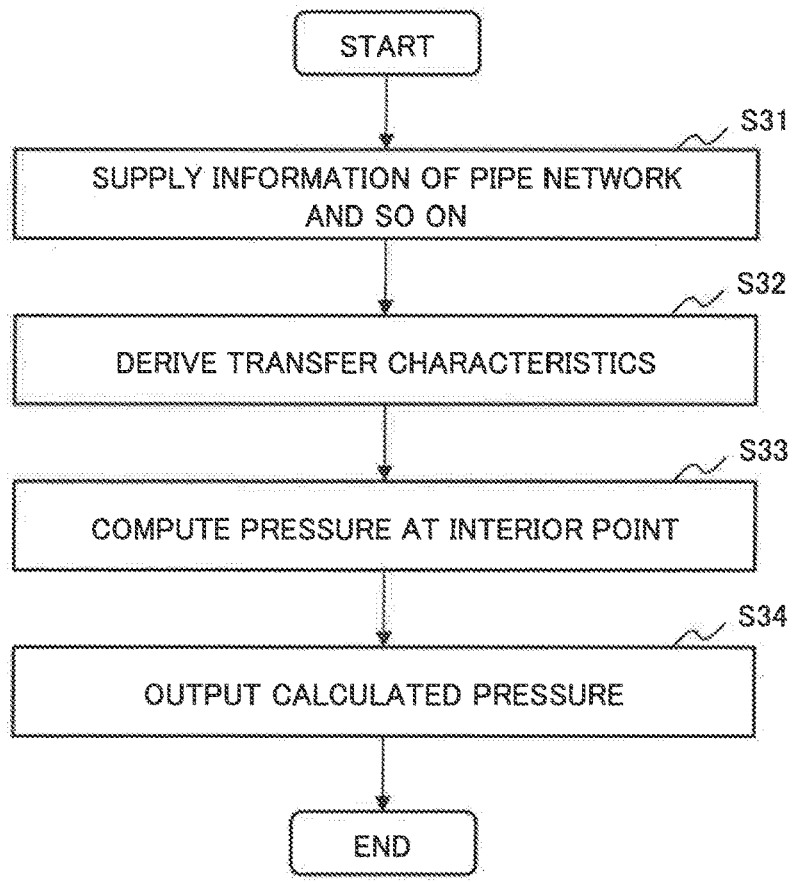
FIG. 3 is a flow chart illustrating a flow of an operation of the analysis device according to the first example embodiment.

The operation is described. FIG. 3 is a flow chart illustrating a flow of an operation of the analysis device 11 according to the present example embodiment.

The input/output unit 101 supplies information about pipe network and the like necessary for analysis to the transfer characteristics derivation unit 102 (step S31). Specifically, in the case of supplying information of the pipe network exemplified in FIG. 2, the input/output unit 101 supplies a linkage relationship among the points 1, 2, 3, 4 and 5 and parameters related to pipes between the points. It is assumed, for example, that the input/output unit 101 supplies "100 m" as a length of the pipe between the point 1 and the point 5, "30 mm" as the diameter of that pipe, "100" as the flow coefficient in that pipe, "20 m" as a length of the pipe between the point 5 and the point 3, "30 mm" as the diameter of that pipe, "100" as the flow coefficient in that pipe, "80 m" as a length of the pipe between the point 3 and the point 2, "25 mm" as the diameter of that pipe, "80" as the flow coefficient in that pipe, "120 m" as a length of the pipe between the point 3 and the point 4, "30 mm" as the diameter of that pipe, "100" as the flow coefficient in that pipe.

The input/output unit 101 also supplies the water pressure at the end points (points 1, 2, and 4 among the points illustrated in FIG. 2) to the computation unit 103.

The transfer characteristics derivation unit 102 derives transfer characteristics on the basis of the information of the pipe network (step S32). When the information of the pipe network exemplified in FIG. 2 is input, the transfer characteristics derivation unit 102 calculates an admittance matrix that represents a relation between voltage and current at nodes corresponding to the points 1, 2, 4 and 5, on the electrical circuit network that is a model of the pipe network, for example.

In calculating the above-described admittance matrix, the transfer characteristics derivation unit 102 models the pipe network into an electrical circuit network on the basis of the pipe network information supplied from the input/output unit 101. Specifically, the transfer characteristics derivation unit 102 generates data for simulating the electrical circuit network imitating the pipe network.

Figure 5:
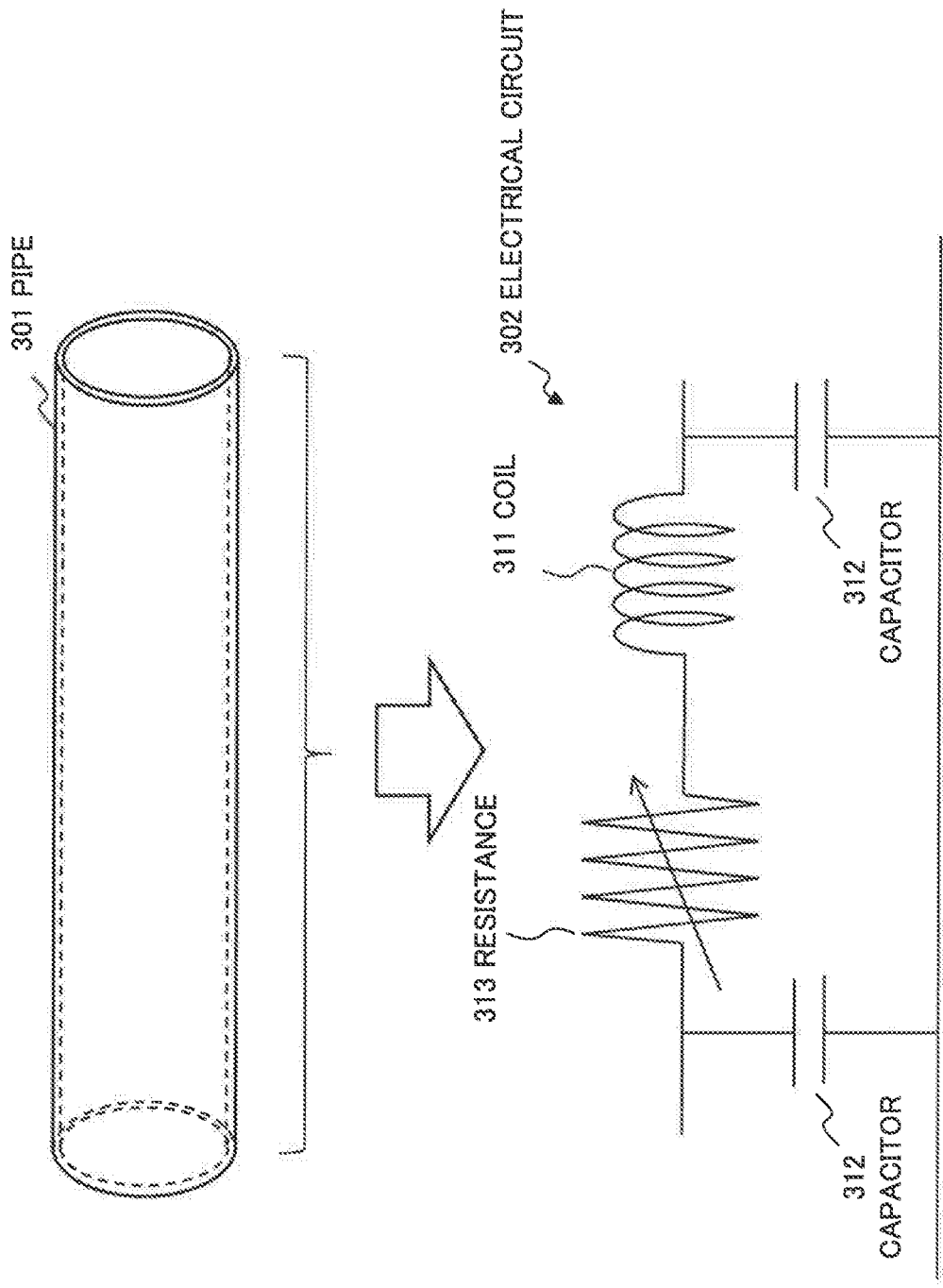
FIG. 5 is a conceptual diagram illustrating an example of replacing a water pipe to an electrical circuit.

The transfer characteristics derivation unit 102 may model an element constituting the pipe network (pipe and the like) by combining circuit elements and the like. For example, the pipe 301 constituting the pipe network may be deemed to correspond to the electrical circuit 302 configured by a coil 311, a capacitor 312 and a resistance 313, as exemplified in FIG. 5. Therefore, the transfer characteristics derivation unit 102 may model, for example each of the pipes 301 connecting the points illustrated in FIG. 2 with respective one of electrical circuits 302. Here, the inductance L of the coil 311, the capacitance C of the capacitor 312, the resistance R of the resistance 313 of the electrical circuit 302 are obtained with the following equation (4).

[Math 4]

$$L = \frac{l}{gA}, \quad C = \frac{lgA}{a^2}, \quad R = \frac{f(V)}{2gD} \quad (4)$$

where:

l: a pipe length g: a gravity acceleration

Figure 6:
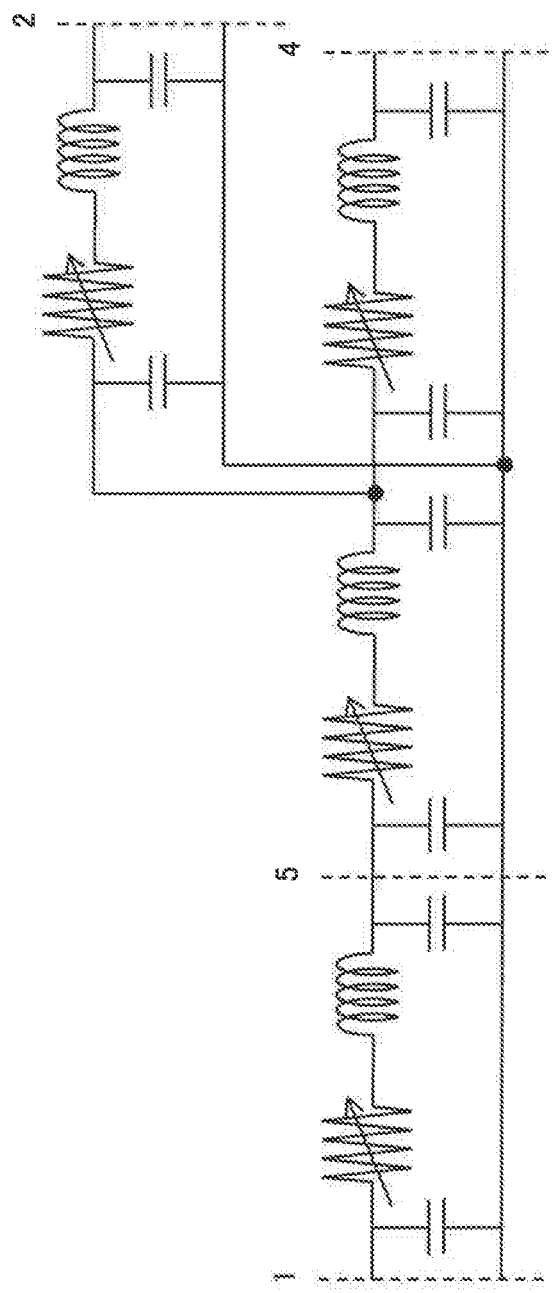
FIG. 6 is an example of an electrical circuit network in which the pipe network illustrated in FIG. 2 is modeled.

A: a pipe cross-section area a: a pressure propagation velocity (i.e. a sound velocity in water) in a water pipe f(V): a function which depends on a pressure V D: a diameter of a pipe The transfer characteristics derivation unit 102 virtually constructs an electrical circuit network that can be generated by replacing the pipes between the points in the pipe network with the electrical circuits 302 configured by the coil 311, the capacitor 312 and the resistance 313 illustrated in FIG. 6, for example. Specifically, the transfer characteristics derivation unit 102 generates data for generating an electrical circuit network that models the pipes between the points with electrical circuits 302, and then supplies the data to an circuit simulator, for example. As a result, an electrical circuit network based on the pipe network is virtually generated.

The electrical circuit network generated by modeling each pipe with the above-described electrical circuits 302 is illustrated in FIG. 6. In FIG. 6, the broken lines with numbers represent the positions of the terminals corresponding to respective one of the points of the pipe network illustrated in FIG. 2.

The transfer characteristics derivation unit 102 may use a circuit element for modeling the amount of pressure (pressure drop) dropped by the resistance 313, instead of the resistance 313. Assuming the pressure drop as P, P is expressed with the following equation (5) on the basis of the Hazen-Williams equation, for example.

[Math 5]

$$P = \frac{10.67 l Q^{1.85}}{C_Q^{1.85} D^{4.87}} \quad (5)$$

where:
P: a pressure loss (i.e. loss of water head),
$C_Q$: a flow coefficient,
D: a diameter of a pipe,
l: a pipe length, and
Q: a flow rate (obtained from a product of a flow velocity and a pipe cross-section area).

In the equation (5), the flow coefficient is a coefficient that indicates the flow easiness of the fluid in the pipe, and is determined depending on the material of the pipe and degree of aging. Note that the equation (5) is an example in the case fluid flowing in the pipe network is water, and an appropriate equation may be used as an equation to express the pressure drop depending on the type or various conditions of fluid.

The transfer characteristics derivation unit 102 may use, for example, a circuit element representing the pressure drop expressed by the equation (5) in the electrical circuit network. The transfer characteristics derivation unit 102 may model the resistance 313 using, for example, a non-linear voltage power source whose output voltage changes depending on the current.

The transfer characteristics derivation unit 102 supplies data used for simulating the electrical circuit network modeled as described above into an electrical circuit simulator. Then, the transfer characteristics derivation unit 102 causes the electrical circuit simulator to calculate the admittance matrix related to the nodes (the points 1, 2, 4 and 5, as with the case of the example illustrated in FIG. 2) corresponding to the end points and the interior point, on the basis of the electrical circuit network.

The transfer characteristics derivation unit 102 calculates the admittance matrix with an electrical circuit simulator by performing, for example, an analysis using input signal the amplitude of which is small, called small-signal analysis. The small-signal analysis is an analysis method in which a non-linear element in the electrical circuit is able to be regarded as linear by assuming the amplitude of the input signal is small. In the small-signal analysis, under the assumption that the amplitude of the input signal is small, a small-signal model that is constituted with linear elements is assumed, and an output in response to a voltage with a designated frequency is able to be calculated. In other words, with the small-signal analysis, even when the electrical circuit contains a circuit element representing a non-linear relation between voltage and current, the admittance matrix is able to be numerically calculated in an approximate manner.

The transfer characteristics derivation unit 102 acquires the calculated admittance matrix as the transfer characteristics. For example, in the case the admittance matrix as to the points 1, 2, 4 and 5 in the example illustrated in FIG. 2 is calculated, the transfer characteristics derivation unit 102 derives, as the transfer characteristics, the values of $Y_{11}$, $Y_{12}$, $Y_{14}$, $Y_{15}$, $Y_{21}$, $Y_{22}$, $Y_{24}$, $Y_{25}$, $Y_{41}$, $Y_{42}$, $Y_{44}$, $Y_{45}$, $Y_{51}$, $Y_{52}$, $Y_{54}$, and $Y_{55}$ each of which corresponds to respective one of elements of the admittance matrix in the equation (1). The transfer characteristics derivation unit 102 may obtain only a value of the element relating to the point 5. In other words, transfer characteristics derivation unit 102 may obtain $Y_{51}, Y_{52}, Y_{54}$ and $Y_{55}$ which are correspond to $Y_{n1}$ to $Y_{nn}$ in the equation (2) as the transfer characteristics. The transfer characteristics derivation unit 102 transmits the derived transfer characteristics to the computation unit 103.

The computation unit 103 computes water pressure at the interior point (the point 5, as with the case of the example illustrated in FIG. 2) on the basis of the transfer characteristics and water pressure at the end points (the points 1, 2, and 4, as with the case of the example illustrated in FIG. 2) supplied from the input/output unit 101 (step S33). Specifically, as with the case of the example illustrated in FIG. 2, the computation unit 103 computes the values of $V_1$ to $V_4$ (corresponding to $V_1$ to $V_{n-1}$ in the equation (3)) by transforming the water pressure at the end points to a voltage value. Then, the computation unit 103 obtains the value of $V_5$ (corresponding to $V_n$ in the equation (3)) by plugging the values of $V_1$ to $V_4$ and $Y_{51}$ to $Y_{55}$ into the equation (3). The computation unit 103 transforms the calculated $V_5$ to a value of water pressure, and computes the transformed value as the water pressure at the interior point.

At last, the input/output unit 101 outputs the computed water pressure (step S34).

<Main Operation>

Figure 4:
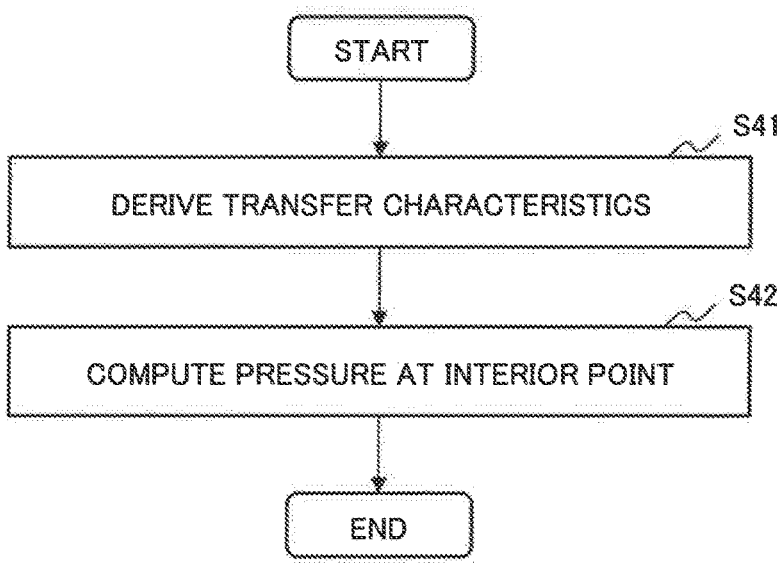
FIG. 4 is a flow chart illustrating a main operation of the analysis device according to the first example embodiment.

The main operation of the analysis device 11 according to the present example embodiment is illustrated in the flow chart in FIG. 4. In the step S41, the transfer characteristics derivation unit 102 derives transfer characteristics that represents the relation between voltage at a plurality of nodes included in an electrical circuit that is the modeling of the pipe network and voltage at an interior node that is a different node from the plurality of nodes. Note that an interior node is a node inside the electrical circuit. In the step S42, the computation unit 103 computes the pressure of fluid at a position in the pipe network corresponding to the interior node, on the basis of the transfer characteristics and fluid pressure at positions in the pipe network corresponding to the plurality of nodes.

<Effect>

With the present example embodiment, an output destination (a user, for example) can acquire a value of water pressure at an interior point computed from data of water pressure at end points. The output destination can evaluate accuracy of the pipe network information used in the simulation by comparing the value of water pressure with an actually measured value of water pressure.

In other words, with the present example embodiment, precision of the model of a pipe network can be evaluated without using the information of flow amount.

Second Example Embodiment

The analysis device may be configured to calculate a feature of the water pressure transition at the interior point from a feature of the water pressure transition at the end point. The operation of components in such configuration is described below as the second example embodiment.

The configuration of the second example embodiment is similar to that of the first example embodiment. The explanation hereinafter is based on that the pipe network, the interior point, and the end points are assumed to be similar to those of the example in the first example embodiment.

The input/output unit 101 acquires waveform data of water pressure at the end points (points 1, 2, and 4, as with the case of the example illustrated in FIG. 2). The waveform data of water pressure is data representing a feature of the transition of the water pressure. The feature of the transition of the water pressure is, for example, the information about the transition of the water pressure that may change according to the condition of the pipe network. In other words, the feature of the transition of the water pressure is meaningful information related to the transition of the water pressure. The waveform data of the water pressure is, for example, data representing a transition of the water pressure with the lapse of time. The data is, for example, a measured value acquired with a sensor.

Figure 7:
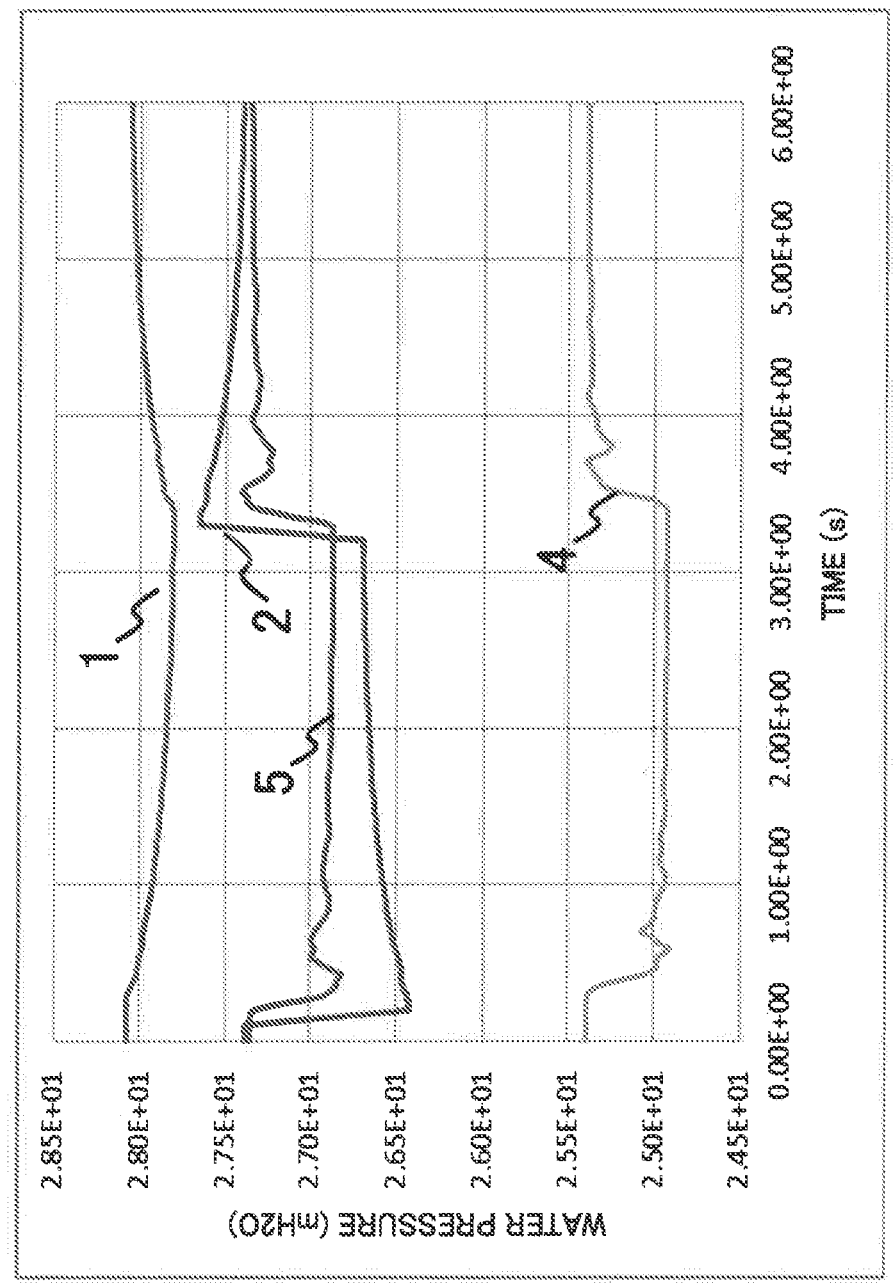
FIG. 7 is a graph illustrating an example of a change of the water pressure with the lapse of time at each point in the pipe network.

FIG. 7 is an example of the data of the change of the water pressure with the lapse of time at each point of the plurality of points. In FIG. 7, the numerals pointing the graphs is the numerals of points in FIG. 2. Note that, in the example in FIG. 7, while each data is represented by a graph, the data handled by the analysis device 11 needs not to be graphed. The data may be a data string in which the time and the water pressure is associated.

The waveform data of the water pressure may be described with, for example, information about an amplitude at each frequency of water pressure, i.e., a frequency distribution. In this case, the waveform data of the water pressure may include information of a phase at each frequency of water pressure.

The input/output unit 101 supplies the acquired waveform data of the water pressure to the computation unit 103. The input/output unit 101 transforms the acquired waveform of the water pressure to the frequency distribution accordingly, and supplies the frequency distribution to the computation unit 103. For example, when the acquired waveform is the change of the water pressure with the lapse of time, the input/output unit 101 may acquire the frequency distribution by performing the Fourier transform. The input/output unit 101 supplies the frequency distribution to the computation unit 103.

In the case of the example embodiment, the transfer characteristics derivation unit 102 derives the transfer characteristics for each frequency of the voltage.

For example, the transfer characteristics derivation unit 102 obtains the transfer characteristics for each frequency by supplying sine waves in various frequencies to the terminal of the electrical circuit simulator, and by acquiring output current.

The transfer characteristics derivation unit 102 may obtain the transfer characteristics at each frequency by performing Fourier transform to the response characteristics returned when inputting impulse waveform into the electrical circuit simulator.

The computation unit 103 computes the frequency distribution at the interior point on the basis of the transfer characteristics at each frequency and the frequency distribution supplied from the input/output unit 101. Specifically, the computation unit 103 computes an amplitude of the water pressure at the interior point on the basis of the transfer characteristics and values of amplitude at the end points, for each frequency. Accordingly, the computation unit 103 acquires the amplitude of water pressure at the interior point for each frequency, i.e., the frequency distribution.

Note that the computation unit 103 may perform inverse Fourier transform to the acquired frequency distribution and transform to the waveform data with the lapse of time. In the following, the waveform data generated by the computation by the computation unit 103 (which means also data representing the frequency distribution) is also referred to as the computed interior wave data.

The input/output unit 101 outputs the computed interior wave data computed by the computation unit 103.

Accordingly, an output destination (a user, for example) can acquire waveform data of the water pressure at the interior point computed based on the waveform data at the end points. The output destination can evaluate precision of the information of the pipe network (analysis model) used for simulation by, for example, comparing the waveform data with an actual waveform data.

Third Example Embodiment

In the previous example embodiment, the input/output unit 101 may acquire the information of the pipe network used for computing the transfer characteristics from a specific device (an external storage device, for example). As the third example embodiment, the configuration in which the analysis device acquires the information of the pipe network from the specific device is described.

Figure 8:
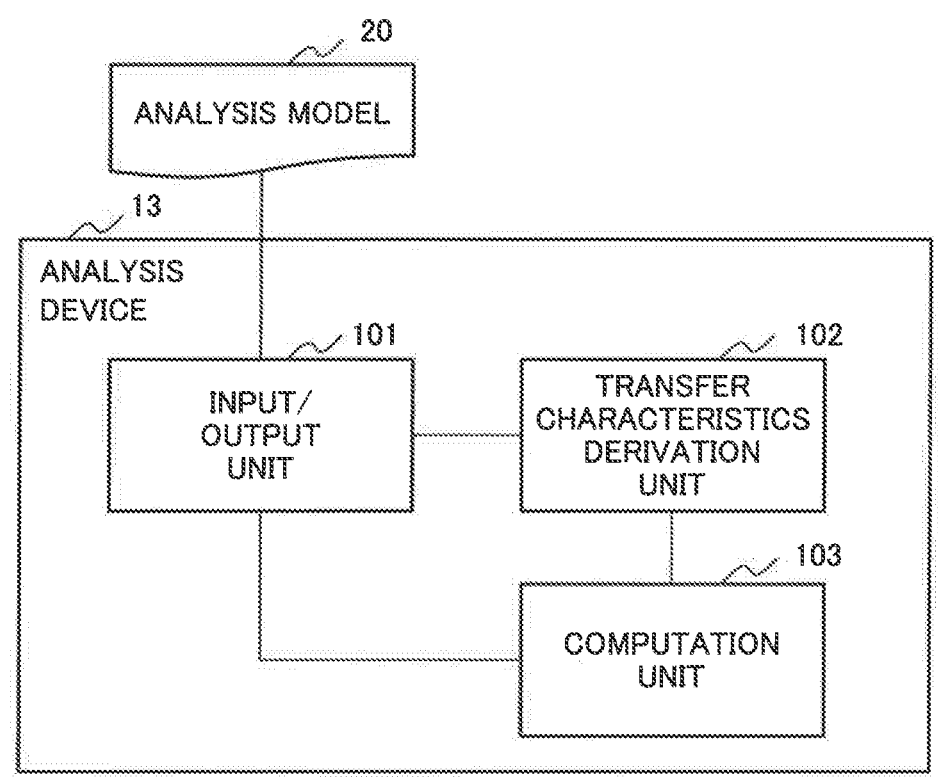
FIG. 8 is a block diagram illustrating a configuration of the analysis device according to the third example embodiment of the present invention.

FIG. 8 is a block diagram illustrating a configuration of the analysis device 13 according to the third example embodiment of the present invention. The configuration of the analysis device 13 may be similar to that of the analysis device 11 or 12 according to the first or second example embodiment. The component to which the same reference sign as the component of the first or second example embodiment is given has a similar function as that of the corresponding component according to the first or second example embodiment.

The input/output unit 101 of the analysis device 13 according to the present example embodiment acquires the analysis model 20.

The analysis model 20 is information representing the pipe network. The analysis model 20 may be the information of the pipe network described in the first example embodiment. The analysis model 20 is used by, for example, a simulation device (not illustrated) that simulates fluid flowing in the pipe network. The analysis model 20 may be information representing an electrical circuit network that imitates the pipe network. The analysis model 20 is retained by, for example, the storage device included in the above-described simulation device or the like. The analysis model 20 may be retained by a computer that implements the analysis device 13.

The input/output unit 101 acquires designation of an analysis target area and designation of an interior point out of the analysis model 20, and supplies the acquired designation to the transfer characteristics derivation unit 102. The designation of the analysis target area and the designation of the interior point may be input to the input/output unit 101 by a user who is able to refer to the analysis model 20, for example. The input/output unit 101 extracts information of the pipe network within the analysis target area, and supplies the extracted information to the transfer characteristics derivation unit 102.

The configuration allows an analysis of the pipe network represented by the analysis model 20.

A result of the analysis is output to the user by the input/output unit 101, for example. The user can obtain the pressure at the designated interior point that is computed from the pressure (which means also waveform data) at the endpoints in the designated area in the analysis model 20.

The user can compare the pressure at the interior point computed by the analysis device 13 and measured pressure when the user selects, as the end points and the interior point, points at which the water pressure can be measured in the pipe network shown by the analysis model 20.

Fourth Example Embodiment

The fourth example embodiment of the present invention is described. The analysis device 14 according to the fourth example embodiment can evaluate the precision of the analysis model 20.

<Configuration>

Figure 9:
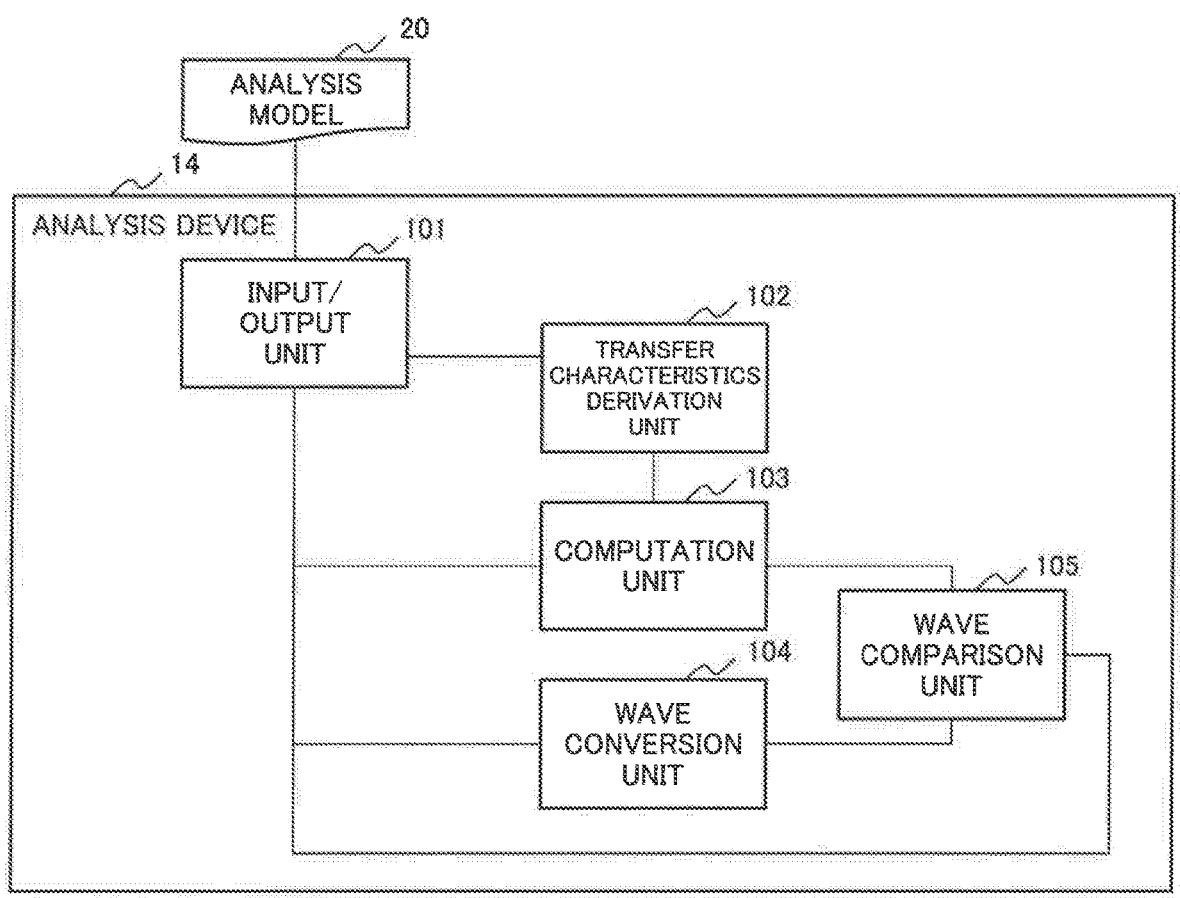
FIG. 9 is a block diagram illustrating a configuration of the analysis device according to the fourth example embodiment of the present invention.

FIG. 9 is a block diagram illustrating a configuration of the analysis device 14 according to the fourth example embodiment. The analysis device 14 includes a wave conversion unit 104 and the wave comparison unit 105, in addition to the components of the third example embodiment illustrated in FIG. 8.

The component to which the same numeral as the component of the third example embodiment is given has a similar function as that of the corresponding component according to the third example embodiment.

The input/output unit 101 has the equivalent function as that of the input/output unit 101 in the third example embodiment. In addition, the input/output unit 101 of the example embodiment supplies the waveform data of the water pressure at the interior point (point 5, as with the case of the example illustrated in FIG. 2) to the wave conversion unit 104. Hereinafter, the waveform data of the water pressure at the interior point supplied from the input/output unit 101 is also referred to as input interior wave data. The input interior wave data may be a waveform in time domain, or may be a frequency distribution.

The wave conversion unit 104 converts the input interior wave data acquired from the input/output unit 101. For example, the wave conversion unit 104 receives the waveform of the water pressure in time domain at the point 5 from the input/output unit 101, and then performs Fourier transform or the like to convert to frequency distribution of the water pressure. The wave conversion unit 104 outputs the converted waveform data to the wave comparison unit 105 as the input interior wave data.

The wave comparison unit 105 compares the input interior wave data output by the wave conversion unit 104 and the computed interior wave data computed by the computation unit 103. The waveform data used for comparison may be a frequency distribution or a waveform in the time domain. In order to unify the type of waveform data to be compared, the wave comparison unit 105 may convert one waveform type to the type of the other waveform data. For example, the wave comparison unit 105 may convert the frequency distribution into a waveform in the time domain by performing the inverse Fourier transform or the like, in the case comparing two waveforms in the time domain.

The difference between the two waveform data is calculated as the comparison of the two waveforms. The difference is, for example, information that indicates degree of unresemblance between two data. The difference is, in other words, information indicating the degree of discrepancy. The information indicating the degree of discrepancy between the two waveform data (referred to as discrepancy degree) may be described with the magnitude or ratio of discrepancy, for example. The discrepancy degree of the two waveform data may be obtained, for example, by adding the difference of the absolute value at each characteristic point of the two waveform data respectively. The method of calculating the discrepancy degree is not limited to the above. The wave comparison unit 105 may calculate, instead of the discrepancy degree, but degree of conformity (or resemblance degree). The degree of conformity may be calculated by, for example, counting the characteristic points at which the frequency matched, out of the best 8 characteristic points in each waveform data, or the like.

The input/output unit 101 outputs a result of comparison by the wave comparison unit 105. For example, the input/output unit 101 outputs the discrepancy degree calculated by the wave comparison unit 105, as the result of comparison.

<Operation>

The operation of the analysis device 14 according to the fourth example embodiment is described with specific examples.

Figure 10:
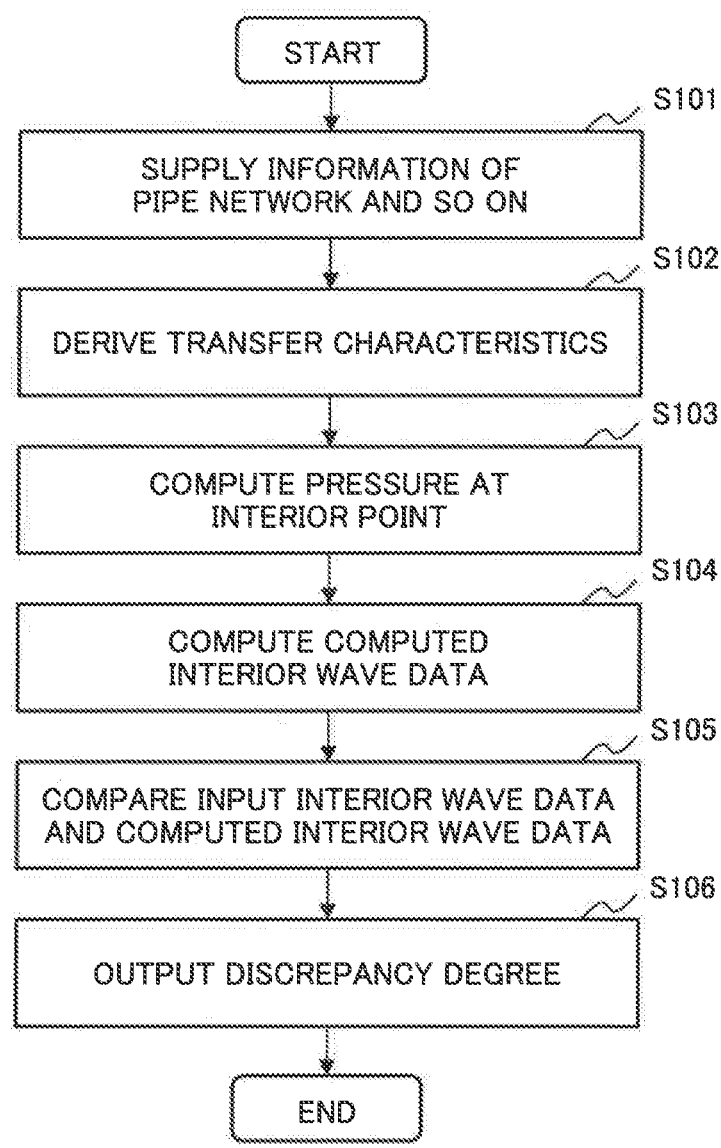
FIG. 10 is a flow chart illustrating a flow of an operation of the analysis device according to the fourth example embodiment.

FIG. 10 is a flow chart illustrating a flow of an operation of the analysis device 14 according to the fourth example embodiment.

Steps S101 to S103 correspond to the steps S31 to S33 in the first example embodiment. Therefore, the description of the steps S101 to S103 are omitted.

It is assumed that, the input/output unit 101 supplies the waveform of water pressure at an interior point in the time domain to the wave conversion unit 104 in the step S101. The wave conversion unit 104 converts the waveform in the time domain to the frequency distribution with Fourier transform.

In the step S104, the computation unit 103 computes computed interior wave data on the basis of the transfer characteristics at each frequency and the frequency distribution supplied from the input/output unit 101. This processing may be similar to that of the second example embodiment.

In the step S105, the wave comparison unit 105 compares the computed interior wave data computed by the computation unit 103 and the input interior wave data output by the wave conversion unit 104. Specifically, the wave comparison unit 105 calculates the discrepancy degree between the computed interior wave data computed by the computation unit 103 and the input interior wave data output by the wave conversion unit 104.

In the description, the wave comparison unit 105 calculates the discrepancy degree between the above-described two waveform data expressed with the frequency distribution. For example, the wave comparison unit 105 calculates the difference of the absolute values of the water pressure at each frequency for every 0.5 Hz from 1 Hz to 10 Hz, and then sums the values as the discrepancy degree. As a result, the wave comparison unit 105 calculates a value like "0.29" as the value of the discrepancy degree, for example.

At last, the input/output unit 101 outputs the value of the discrepancy degree calculated by the wave comparison unit 105 (step S106).

Figure 11:
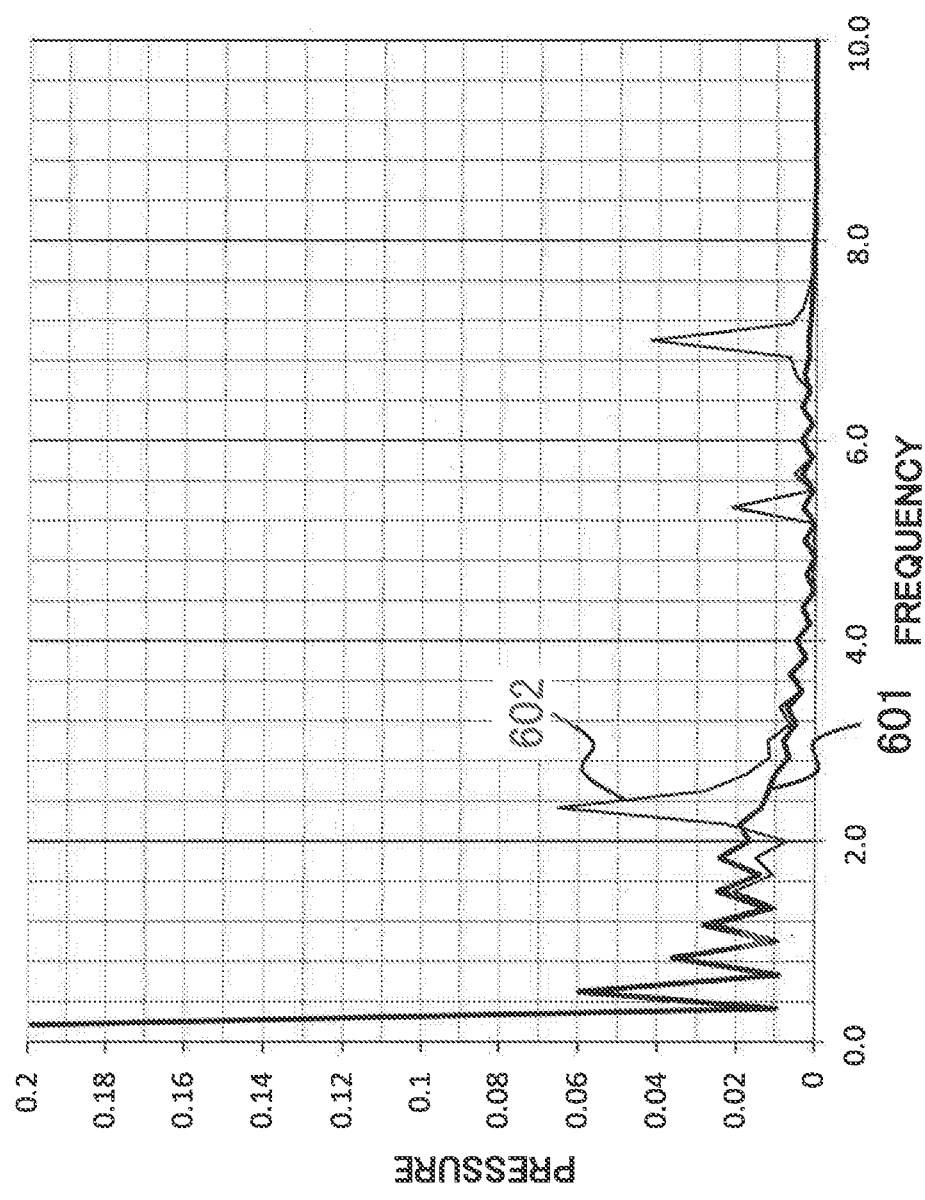
FIG. 11 is an example in which an output device according to the fourth example embodiment displayed a graph of input interior wave data and computed interior wave data in an overlapping manner.

In the step S106, the input/output unit 101 may display the graph of the computed interior wave data computed by the computation unit 103 and the graph of the input interior wave data derived by the wave conversion unit 104 in an overlapping manner. FIG. 11 is an example the two waveform data described above displayed in an overlapping manner. In FIG. 11, the graph 601 is the graph of the input interior wave data, and graph 602 is the graph of the computed interior wave data. Such a display lets output destination (a user for example) understand the discrepancy degree of the two waveform data intuitively.

<Effect>

With the present example embodiment, the output destination can know the precision of the analysis model. The reason is that the wave comparison unit 105 calculates the discrepancy degree between the computed interior wave data computed by the computation unit 103 and the input interior wave data output by the wave conversion unit 104. When the input interior wave data is data based on measured data, the calculated discrepancy degree is an index of precision of the analysis model. When the value of the discrepancy degree is large, the output destination can understand precision of the analysis model is low.

Fifth Example Embodiment

Figure 12:
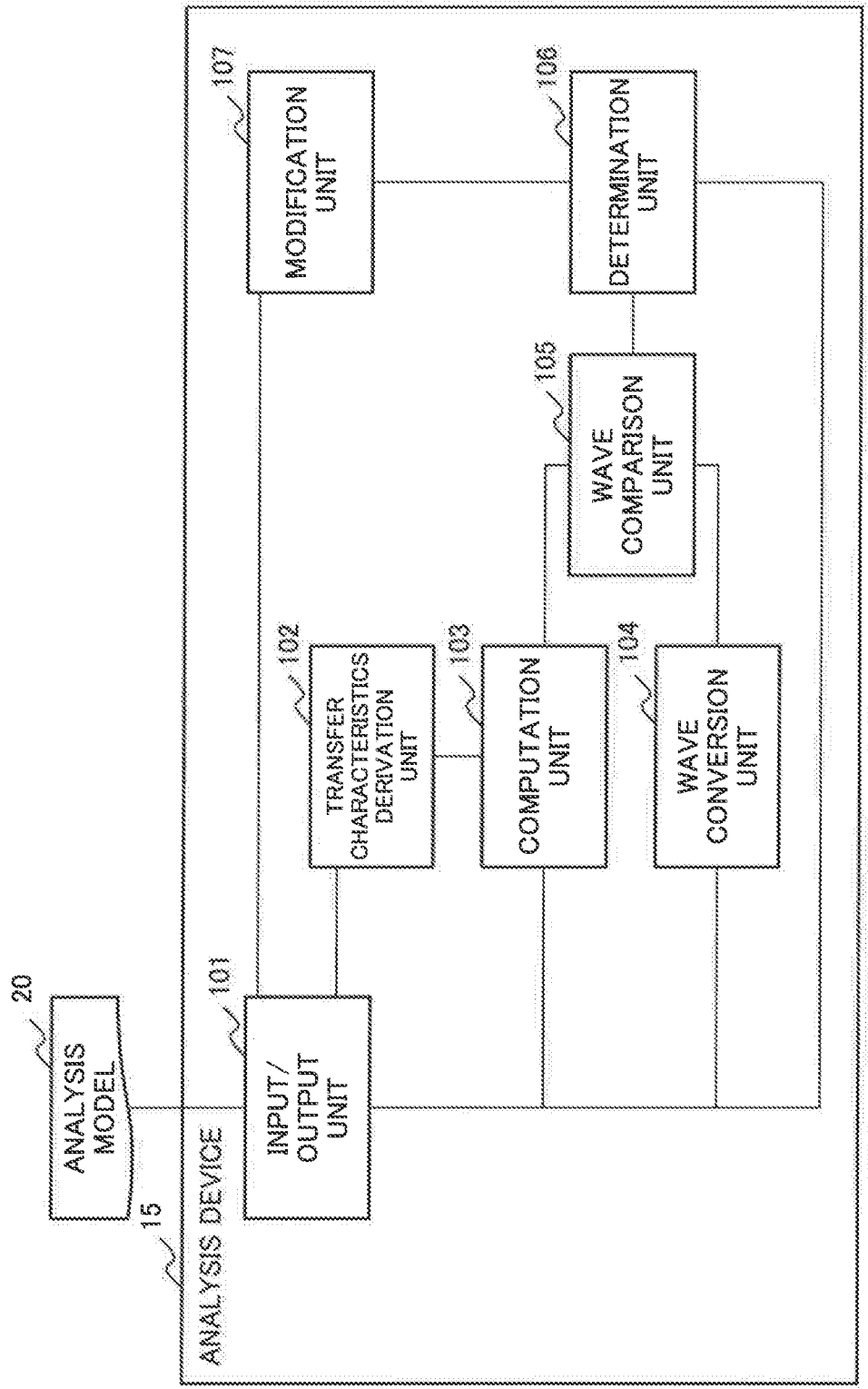
FIG. 12 is a block diagram illustrating a configuration of the analysis device according to the fifth example embodiment of the present invention.

The fifth example embodiment of the present invention is described. The analysis device 15 according to the fifth example embodiment can improve the precision of the analysis model 20.
<Configuration>
FIG. 12 is a block diagram illustrating a configuration of the analysis device 15 according to the fifth example embodiment. The analysis device 15 includes a determination unit 106 and a modification unit 107, in addition to the components of the third example embodiment illustrated in FIG. 9.

Same reference signs are used to the components having similar function as that of the fourth example embodiment, and the detailed description thereof are omitted.

The input/output unit 101 has the equivalent function as that of the input/output unit 101 in the fourth example embodiment. In addition, the input/output unit 101 of the example embodiment supplies information of a determination criterion to the determination unit 106. The determination criterion is a criterion of determination performed by the determination unit 106. The information of the determination criterion is, for example, an allowable range of the value of the discrepancy degree. The information of the determination criterion may be the upper limit of an allowable discrepancy degree, i.e., the threshold value. In such a case, the determination criterion is that the discrepancy degree is equal to or smaller than the threshold value.

The input/output unit 101 supplies parameters of the analysis model 20 to be modified out of the parameters related to the pipe in the analysis target area to the modification unit 107. For example, the input/output unit 101 designates, to the modification unit 107, one or more parameters of the analysis model 20 out of the parameters related to the pipe in the analysis target area as the parameter to be modified. The parameters to be modified are, for example, the length or coefficient of friction of a pipe between points. The input/output unit 101 may acquire the parameter to be modified by, for example, accepting designation by a user. In such a case, the user may, for example, specify one or more parameters that are considered to be differ between the actual value and the value in the analysis model 20, on the basis of the number of years in use or the like, as the parameters to be modified.

The determination unit 106 determines whether or not the discrepancy degree calculated by the wave comparison unit 105 satisfies the determination criterion based on the supplied from the input/output unit 101. When the discrepancy degree does not satisfy the determination criterion, the analysis device 15 performs later-described processing by the modification unit 107. When the discrepancy degree satisfies the determination criterion, the analysis device 15 outputs a result of the analysis with the input/output unit 101. The specific example of the determination criterion and the result of the analysis is described later.

The modification unit 107 modifies the parameter of the analysis model 20 designated by the input/output unit 101. For example, the modification unit 107 may modify the parameter on the basis of the value of the discrepancy degree. An algorithm that can bring the value of the parameter to an optimum value by repeating the determination by the determination unit 106 and the modification is used for modification. The modification unit 107 may perform the above-described modification using Nelder-Mead method, or a method based on genetic algorithm, for example. The modification method may be a method using the Kalman filter. The modification method cited above are applicable even when there are two or more parameters to be modified.

The modification unit 107 sends the modified value to, for example, the input/output unit 101. The input/output unit 101 supplies, to the transfer characteristics derivation unit 102, information of the pipe network which reflects on the received modified value. Accordingly, the transfer characteristics derivation unit 102 calculates the transfer characteristics again on the basis of the information of the pipe network with the modified value reflected.

The input/output unit 101 outputs the result of the analysis when the discrepancy degree is determined to satisfy the determination criterion. The result of the analysis is, for example, a result of the modification. The result of the modification is, for example, the modified value and the discrepancy degree that is calculated for the last time. When the analysis model is not modified, the result of the modification may be information showing that the modification has not been performed, or the value of the discrepancy degree. The input/output unit 101 may also output the data representing a whole of the modified analysis model 20.
<Operation>
The operation of the analysis device 15 according to the fifth example embodiment is described with examples.

Figure 13:
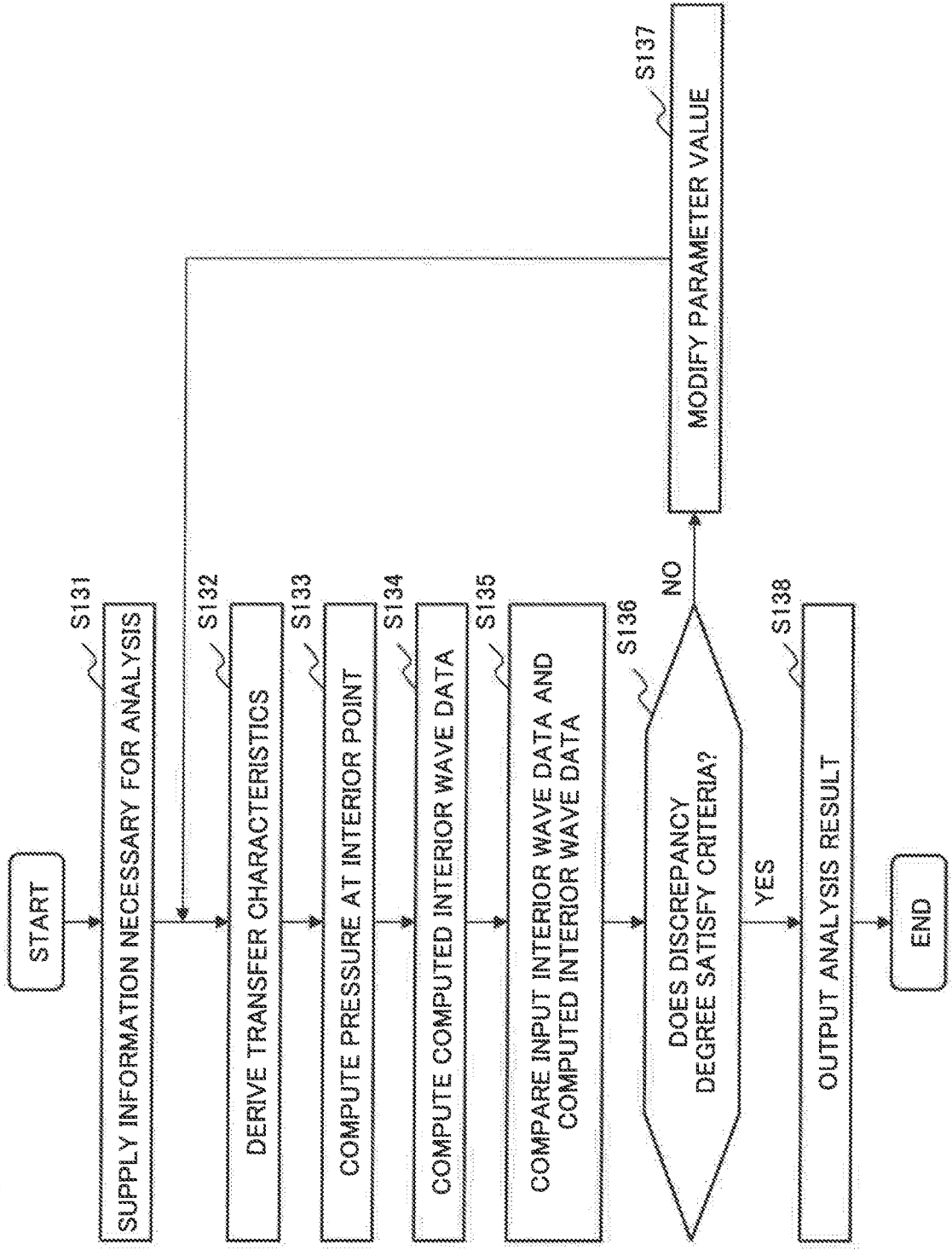
FIG. 13 is a flow chart illustrating a flow of an operation of the analysis device according to the fifth example embodiment.

FIG. 13 is a flow chart illustrating a flow of the operation of the analysis device 15.

The input/output unit 101 supplies information necessary for the analysis to each unit (step S131).

For example, the input/output unit 101 supplies the information of the pipe network and so on to the transfer characteristics derivation unit 102, similar to the step S101 in the fourth example embodiment. The input/output unit 101 also supplies the waveform data of the water pressure at end points of the pipe network to the computation unit 103. The input/output unit 101 may also supplies the waveform of the water pressure at the interior point in the time domain to the wave conversion unit 104.

The input/output unit 101 supplies designation of parameter(s) that is a target of modification in the analysis model 20 to the modification unit 107. It is assumed that the designated parameter is, for example, the length of the pipe between points 3 and 4.

The input/output unit 101 supplies the information of the determination criterion to the determination unit 106. For example, the input/output unit 101 supplies a value "0.1" as the information of the determination criterion to the determination unit 106. The determination unit 106, on the basis of the information, performs later-described determination of the step S136, deeming the determination criterion as "that the discrepancy degree is equal to or smaller than 0.1".

The processing in the step S132 to step S134 may be similar to the processing in steps S102 to S104 of the fourth example embodiment. The transfer characteristics derivation unit 102 derives the transfer characteristics on the basis of the information of the pipe network (step S132). The computation unit 103 computes the pressure at the interior point from the pressure at the end point, on the basis of the transfer characteristics (step S133). The computation unit 103 generates computed interior wave data (step S134).

Then, the wave comparison unit 105 compares the input interior wave data and the computed interior wave data (step S135). For example, the wave comparison unit 105 obtains absolute values of the difference of the water pressure at each characteristic point in the two waveform, and calculate the discrepancy degree by summing up the values. The discrepancy degree calculated by the wave comparison unit 105 is assumed to be, for instance, "0.29".

Then, the determination unit 106 determines whether the discrepancy degree satisfies the determination criterion (step S136). When the discrepancy degree calculated by the wave comparison unit 105 does not satisfy the determination criterion (NO in step S136), the processing by the analysis device 15 proceeds to the step S137, not exiting iterative processing.

The determination criterion in the operation example herein is that, as described above, "the discrepancy degree is equal to or smaller than 0.1". Since the determination criterion is not satisfied when the discrepancy degree is "0.29", the processing by the analysis device 15 proceeds to step S137.

When the discrepancy degree satisfies the determination criterion (YES in step S136), the processing by the analysis device 15 proceeds to step S138.

The modification unit 107 modifies the value of the paramete in step S137. It is assumed that the parameter to be modified is, for example, the length of the pipe between the points 3 and 4. The modification unit 107 modifies the length of the pipe between the points 3 and 4 using an algorithm to modify the value of the parameter. The analysis device 15 performs the operation in step S132 to step S136 again using the value modified by the modification unit 107. The analysis device 15 repeats the processing until the value of the discrepancy degree satisfies the determination criterion. With the above processing, the value of the parameter that satisfies the determination criterion is obtained.

The determination unit 106 may be configured in such a way as to quit the iterative processing in the case the discrepancy degree does not satisfy the determination criterion or the discrepancy degree does not improve after a predetermined times of repeating or after predetermined time.

It is assumed that the discrepancy degree has become "0.08" after the length of the pipe between the points 3 and 4 is modified to be "150 m". Since that value satisfies the determination criterion, the processing by the analysis device 15 exits the iterative processing and proceeds to step S138.

Finally, in the step S138, the analysis device 15 outputs the result of the analysis performed until the step S137, with the input/output unit 101.

Figure 14:
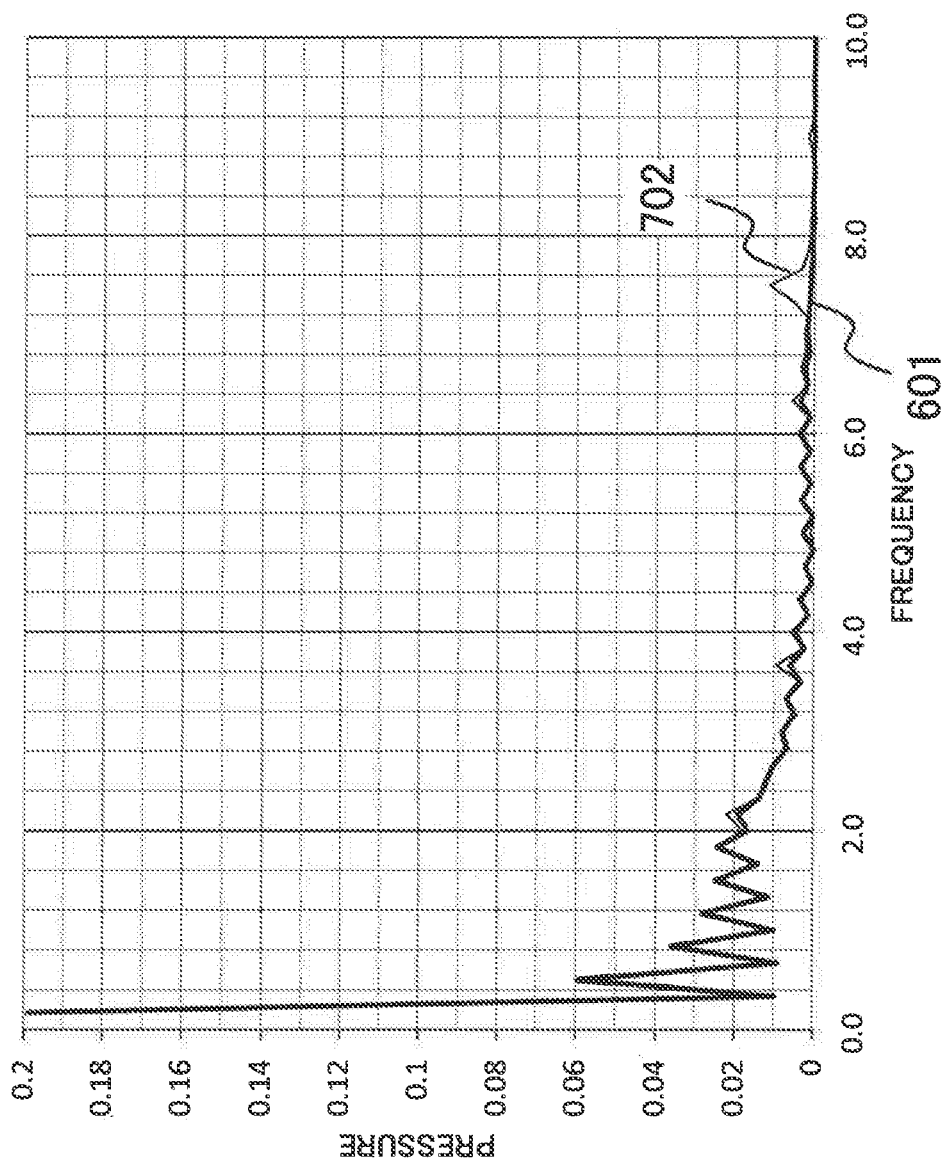
FIG. 14 is an example in which an output device according to the fifth example embodiment displayed a graph of input interior wave data and computed interior wave data in an overlapping manner.

The input/output unit 101 may display the graph of the computed interior wave data computed using the modified value and the graph of the input interior wave data in an overlapping manner. FIG. 14 is an example in which the two waveform data described above displayed in an overlapping manner. In FIG. 14, the graph 601 is the graph of the input interior wave data, and graph 702 is the graph of the computed interior wave data. Such a display lets the output destination understand the discrepancy degree of the two waveform data also intuitively. The input/output unit 101 may also display the computed interior wave data computed using the value of the parameter before modification. As a result, the output destination can easily recognize, for example, whether precision of the analysis model 20 will improve by using the modified value. For example, in the case the computed interior wave data changes from the graph 602 illustrated in FIG. 11 to the graph 702 illustrated in FIG. 14, the output destination can clearly understand that the latter graph better resembles the input interior wave data. The output destination may decide whether or not to modify the parameter on the basis of the display.

<Effect>

The analysis device according to the example embodiment can improve precision of the analysis model 20. The reason is that the modification unit 107 modifies the value of the parameter until the determination criterion is satisfied.

The user may decide whether to modify the parameter or not by watching the output information. As a result, the modification of the analysis model based on the analysis by the analysis device and the decision by the user becomes possible.

Alternatively, the input/output unit 101 may modify the value of the parameter of the analysis model 20 to the value computed by the modification unit 107. With the configuration, the analysis model 20 is automatically modified to a more precise analysis model.

<<Configuration of Hardware and Software Program (Computer Program)>>

Hereinafter, the hardware configuration that is capable of achieving each of the above-described example embodiment is described.

Figure 15:
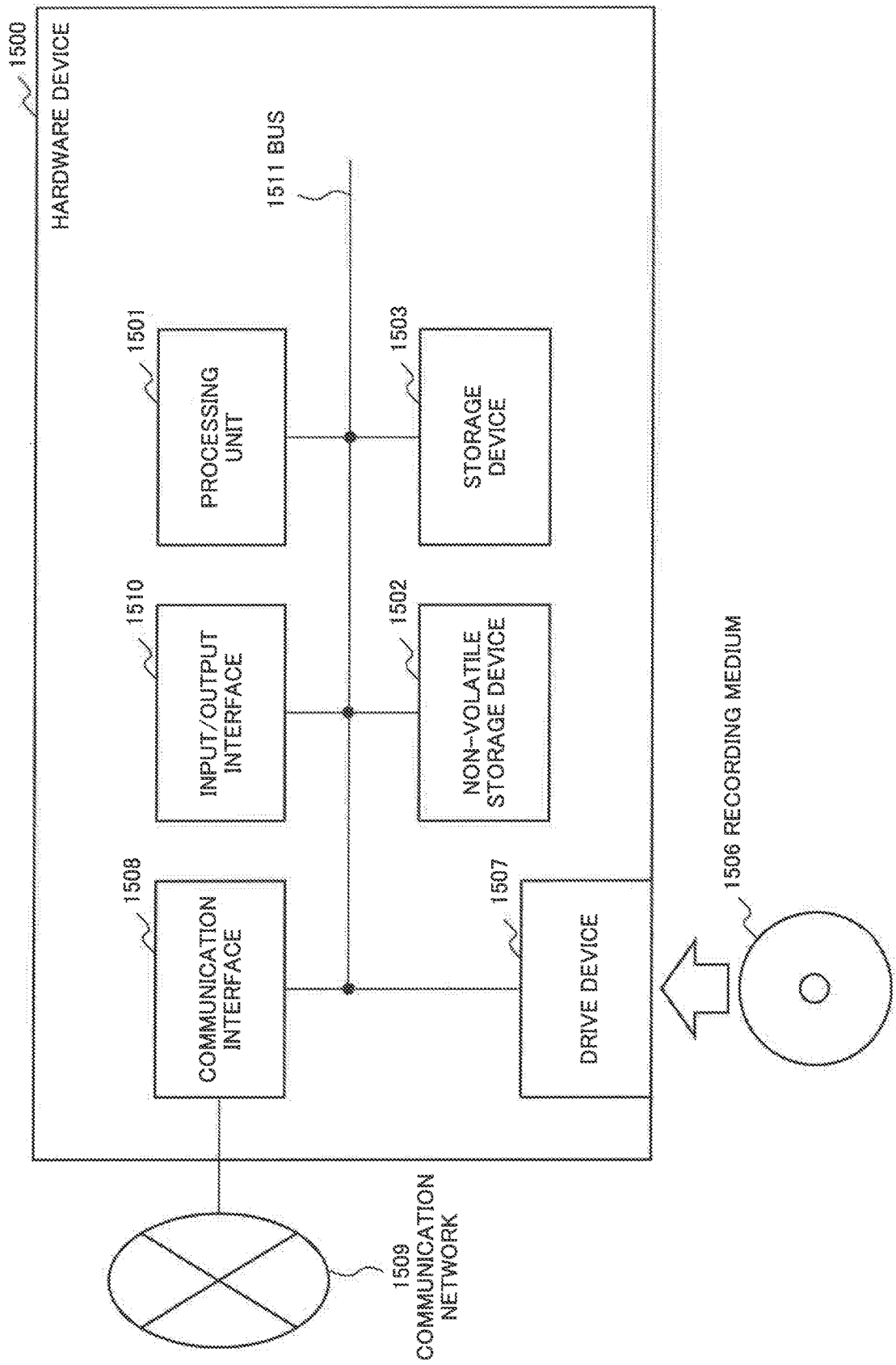
FIG. 15 is a block diagram exemplifying a hardware configuration capable of achieving the pipe network analysis device according to each example embodiment of the present invention.

The above-described analysis device or the component of the analysis device may be achieved by a combination of a part or all of hardware exemplified in FIG. 15 and various software program (computer program) executed by the hardware.

The computing device 1501 in FIG. 15 is a processing device such as a generic CPU, a microprocessor or the like. The computing device 1501 may load the various software program stored in the non-volatile storage device 1502 onto the storage device 1503, and execute the processing according to the loaded software program. Note that the transfer characteristics derivation unit 102, computation unit 103, wave conversion unit 104, wave comparison unit 105, determination unit 106 and the modification unit 107 of each example embodiment may execute respective processing using the computing device 1501.

The storage device 1503 is a memory device such as a Random Access Memory (RAM) referable from the computing device 1501, and stores software program, various data and the like. Note that the storage device 1503 may be a volatile memory device.

The non-volatile storage device 1502 is a non-volatile storage device such as a magnetic disk drive or a semiconductor storage device with a flash memory. The non-volatile storage device 1502 can store software program, data and the like. The conversion information that relates the components of the electrical circuit network that imitates the components of the pipe network may be stored in the non-volatile storage device 1502 in the form of a file, a database or the like.

A communication interface 1508 is an interface device connected to a communication network 1509. The communication interface 1508 may be an interface device for connecting to wired or wireless Local Area Network (LAN). Note that the input/output unit 101 in each example embodiment may accept input of the analysis model 20, waveform data at an end or interior, parameter to be modified and the like from other system and the like that are not illustrated via the communication interface 1508.

A drive device 1507 is a device that processes the reading out or writing of the data for the recording medium 1506 described later.

The recording medium 1506 is a recording medium that can record data such as an optical disk, a magneto-optical disk, or a semiconductor flash memory.

The input/output interface 1510 is a device that controls the input/output with an external device. For example, the user of the analysis device may supply, to the analysis device, the information of the pipe network, the designation of the analysis area and the interior point, waveform data, and/or various instruction, using an input/output device (e.g., a keyboard, mouse, display device, printer or the like) connected to the analysis device via the input/output interface 1510. Note that the input/output unit 101 of each example embodiment may be achieved by the input/output device connected to the input/output interface 1510.

In each of the above-described example embodiment, the analysis device may be achieved by the hardware device 1500 exemplified in FIG. 15, for example. Specifically, the analysis device may be achieved by the hardware device 1500 provided with a software program capable of achieving the function described in each example embodiment. In this case, each example embodiment may be achieved by the computing device 1501 executing the software program provided to the hardware device 1500.

In each of the above-described example embodiment, each unit illustrated in the diagrams (e.g., FIGS. 1, 8, 9, and 12) may be implemented as a software module that is a function (processing) unit in the software program executed by the above-described hardware. Note that the grouping of each of the software module illustrated in the diagrams is a configuration regarding the convenience of explanation. Various configurations may be assumed for the implementation of the software module.

For example, provided that the components exemplified in FIGS. 1, 8, 9 and 12 are implemented as software modules, the non-volatile storage device 1502 may store the software modules. The computing device 1501 may be configured to read out the software modules to the storage device 1503 when performing each processing.

The software modules may be configured to transmit data to each other by any appropriate method, e.g., a method using a shared memory or interprocess communication. With the configuration, the software modules may be coupled in a manner being able to communicate to each other.

Moreover, each of the above-described software program may be stored on the recording medium 1506. The software program may be stored in the non-volatile storage device 1502 in the shipping stage or use stage of the above-described communication device or the like, via the drive device 1507.

In the above cases, as the method of providing the software program to the analysis device, a method in which the program is installed in the device using an appropriate jig in the manufacturing step before shipping, or in the maintenance step after shipping or the like may be adopted. As the method of providing the software program, a method ordinary today such as the method in which the program is downloaded from the outside via a communication line such as the Internet may be adopted.

In the above cases, it may be construed that the analysis device in each embodiment is configured with a computer-readable storage medium stored with the program code constituting the software program.

The above-described analysis device or the component of the analysis device may be achieved by a virtual environment in which the hardware device 1500 exemplified in FIG. 15 is virtualized, and various software program (computer program) executed in the virtual environment. In that case, the component of the hardware device 1500 exemplified in FIG. 15 is provided as a virtual device in the virtual environment. Note that the analysis device in each example embodiment can be achieved in the same configuration as that in an embodiment where the hardware device 1500 exemplified in FIG. 15 is achieved as a physical device.

A part or the entire analysis device described in each example embodiment may be configured with a dedicated hardware. In that case, a part or all of the components may be achieved as an integrated hardware (e.g., an integrated circuit implemented with a logic to execute the processing).

For example, in the case of implementing each component with a hardware, each component may be implemented as a System on a Chip (SoC) or the like in which a circuit capable of providing each function is integrated. In this case, the data held by each component may be stored on a RAM area integrated as the SoC or a flash memory area.

In that case, as a communication line connecting each component, a known communication bus may be adopted. The communication line connecting each component is not limited to a communication bus. Each component may be connected peer-to-peer.

Figure 16:
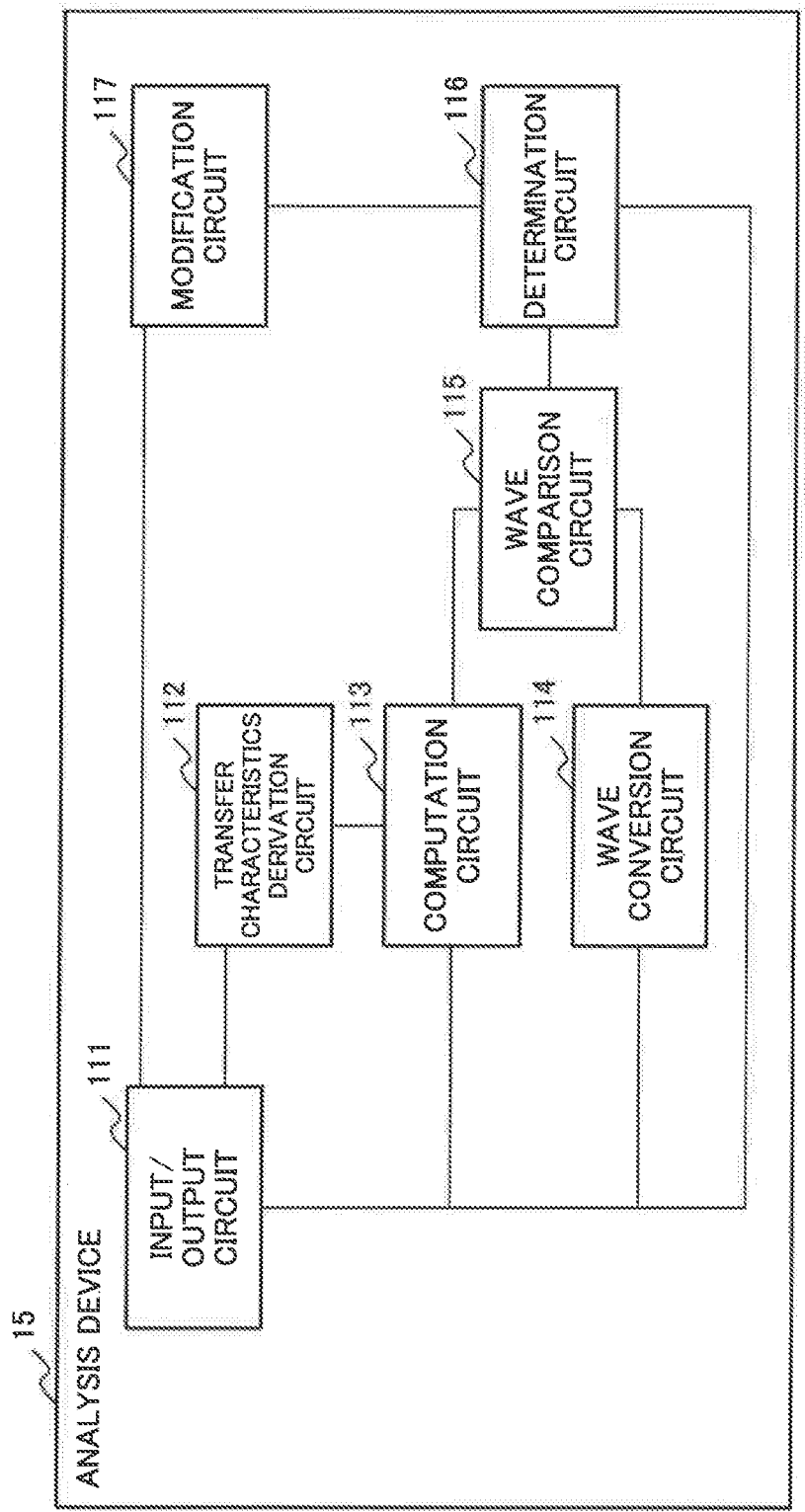
FIG. 16 is a block diagram in the case each unit of the fifth example embodiment is configured with a circuit.

FIG. 16 is a block diagram illustrating the case in which each component of the analysis device in FIG. 15 according to the fifth example embodiment of the present invention is configured with a circuit. In FIG. 16, the input/output circuit 111 functions as the input/output unit 101. The transfer characteristics derivation circuit 112 functions as the transfer characteristics derivation unit 102. The computation circuit 113 functions as the computation unit 103. The wave conversion circuit 114 functions as the wave conversion unit 104. The wave comparison circuit 115 functions as the wave comparison unit 105. The determination circuit 116 functions as the determination unit 106. The modification circuit 117 functions as the modification unit 107.

The present invention is described above with examples applied to each of the example embodiments. However, the technical scope of the present invention is not limited to the scope described in the above-described example embodiments. It is obvious that a person skilled in the art can apply various modification or improvement to the above-described example embodiments. In such a case, a new example embodiment with the modification or improvement is included in the technical scope of the present invention. Moreover, the example embodiment that is the combination of each of the example embodiments described above or the new example embodiment with the modification or improvement is included in the technical scope of the present invention. This is obvious from matters described in claims.

The present application claims the benefits of priority based on Japanese Patent Application No. 2016-064103, filed on Mar. 28, 2016, the entire disclosure of which is incorporated herein by reference.

All or part of the example embodiments described above may be described as in the following supplementary notes, but the present invention is not limited thereto.

(Supplementary Note 1)

An analysis device comprising: transfer characteristics derivation means for deriving a transfer characteristics that represents a relation between a voltage at a plurality of nodes included in an electrical circuit and a voltage at an interior node that is a node in the electrical circuit different from the plurality of nodes, the electrical circuit being a modeling of a pipe network in which fluid flows; and computation means for computing a pressure of the fluid at a position in the pipe network corresponding to the interior node, based on the transfer characteristics and pressures of the fluid at positions in the pipe network corresponding to the plurality of nodes.

(Supplementary Note 2)

The analysis device according to Supplementary Note 1, wherein the transfer characteristics derivation means derives the transfer characteristics according to a frequency of a voltage, and the computation means computes, based on the transfer characteristics and a first feature which is a feature of a change of a pressure of the fluid at positions in the pipe network corresponding to the plurality of nodes, a second feature which is a feature of a change of a pressure of the fluid at a position in the pipe network corresponding to the interior node.

(Supplementary Note 3)

The analysis device according to Supplementary Note 2, further comprising:

input/output means for acquiring a third feature which is a feature of a change of a pressure at the position in the pipe network that corresponds to the interior node; and wave comparison means for calculating a difference between the second feature and the third feature based on the second feature and the third feature.

(Supplementary Note 4)

The analysis device according to Supplementary Note 3, further comprising:

determination means for determining whether the difference satisfies predetermined criterion; and modification means for performing modification of a predetermined parameter in information of the pipe network based on the difference when the determination means determines that the difference does not satisfy the predetermined criterion, wherein the modification means repeats the modification until the determination means determines that the difference calculated based on information of the pipe network to which the modification is applied satisfies the predetermined criterion.

(Supplementary Note 5)

An analysis method comprising:

deriving a transfer characteristics that represents a relation between a voltage at a plurality of nodes included in an electrical circuit and a voltage at an interior node that is a node in the electrical circuit different from the plurality of nodes, the electrical circuit being a modeling of a pipe network in which fluid flows; and computing a pressure of the fluid at a position in the pipe network corresponding to the interior node, based on the transfer characteristics and pressures of the fluid at positions in the pipe network corresponding to the plurality of nodes.

(Supplementary Note 6)

The analysis method according to Supplementary Note 5, further comprising:

deriving the transfer characteristics according to a frequency of a voltage; and computing, based on the transfer characteristics and a first feature which is a feature of a change of a pressure of the fluid at positions in the pipe network corresponding to the plurality of nodes, a second feature which is a feature of a change of a pressure of the fluid at a position in the pipe network corresponding to the interior node.

(Supplementary Note 7)

The analysis method according to Supplementary Note 6, further comprising:

acquiring a third feature which is a feature of a change of a pressure at the position in the pipe network that corresponds to the interior node; and calculating a difference between the second feature and the third feature based on the second feature and the third feature.

(Supplementary Note 8)

The analysis method according to Supplementary Note 7, further comprising:

determining whether the difference satisfies predetermined criterion;

performing modification of a predetermined parameter in information of the pipe network based on the difference when the difference is determined not to satisfy the predetermined criterion; and repeating the modification until the difference calculated based on information of the pipe network to which the modification is applied is determined to satisfy the predetermined criterion.

(Supplementary Note 9)

A computer-readable storage medium storing a program that causes a computer to perform:

transfer characteristics derivation processing for deriving a transfer characteristics that represents a relation between a voltage at a plurality of nodes included in an electrical circuit and a voltage at an interior node that is a node in the electrical circuit different from the plurality of nodes, the electrical circuit being a modeling of a pipe network in which fluid flows; and computation processing for computing a pressure of the fluid at a position in the pipe network corresponding to the interior node, based on the transfer characteristics and pressures of the fluid at positions in the pipe network corresponding to the plurality of nodes.

(Supplementary Note 10)

The storage medium according to Supplementary Note 9, wherein the transfer characteristics derivation processing includes deriving the transfer characteristics according to a frequency of a voltage; and the computation processing includes computing, based on the transfer characteristics and a first feature which is a feature of a change of a pressure of the fluid at positions in the pipe network corresponding to the plurality of nodes, a second feature which is a feature of a change of a pressure of the fluid at a position in the pipe network corresponding to the interior node.

(Supplementary Note 11)

The storage medium according to Supplementary Note 10, wherein the program further causes the computer to perform:

input/output processing for acquiring a third feature which is a feature of a change of a pressure at the position in the pipe network that corresponds to the interior node; and wave comparison processing for calculating a difference between the second feature and the third feature based on the second feature and the third feature.

(Supplementary Note 12)

The storage medium according to Supplementary Note 11, wherein the program further causes the computer to perform:

determination processing for determining whether the difference satisfies predetermined criterion; and modification processing for performing modification of a predetermined parameter in information of the pipe network based on the difference when the determination processing determines that the difference does not satisfy the predetermined criterion, and the modification processing includes repeating the modification until the determination processing determines that the difference calculated based on information of the pipe network to which the modification is applied satisfies the predetermined criterion.

REFERENCE SIGNS LIST 1 to 5 point in a pipe network
11, 13 to 15 analysis device
20 analysis model
101 input/output unit
102 transfer characteristics derivation unit
103 computation unit
104 wave conversion unit
105 wave comparison unit
106 decision unit
107 modification unit
301 pipe
302 electrical circuit
601 graph of input interior wave data
602 graph of computed interior wave data
702 graph of computed interior wave data
1500 computer
1501 computing device
1502 non-volatile storage device
1503 storage device
1506 recording medium
1507 drive device
1508 communication interface
1509 communication network
1510 input/output interface
1511 bus

What is claimed is:

1. An analysis device comprising:
a memory; and
a processing device coupled to the memory and configured to:
derive a transfer characteristics that represents a relation between a voltage at a plurality of nodes included in an electrical circuit and a voltage at an interior node that is a node in the electrical circuit different from the plurality of nodes, the electrical circuit being a modeling of a pipe network in which fluid flows;
compute a pressure of the fluid at a position in the pipe network corresponding to the interior node, based on the transfer characteristics and pressures of the fluid at positions in the pipe network corresponding to the plurality of nodes
derive the transfer characteristics according to a frequency of a voltage; and
compute, based on the transfer characteristics and a first feature which is a feature of a change of a pressure of the fluid at positions in the pipe network corresponding to the plurality of nodes, a second feature which is a feature of a change of a pressure of the fluid at a position in the pipe network corresponding to the interior node.

2. The analysis device according to claim 1, wherein the processing device is further configured to:

acquire a third feature which is a feature of a change of a pressure at the position in the pipe network that corresponds to the interior node; and
calculate a difference between the second feature and the third feature based on the second feature and the third feature.

3. The analysis device according to claim 2, wherein the processing device is further configured to:
determine whether the difference satisfies predetermined criterion; and
perform modification of a predetermined parameter in information of the pipe network based on the difference when the processing device determines that the difference does not satisfy the predetermined criterion,
wherein the processing device is configured to repeat the modification until the processing device determines that the difference calculated based on information of the pipe network to which the modification is applied satisfies the predetermined criterion.

4. An analysis method comprising:
deriving a transfer characteristics that represents a relation between a voltage at a plurality of nodes included in an electrical circuit and a voltage at an interior node that is a node in the electrical circuit different from the plurality of nodes, the electrical circuit being a modeling of a pipe network in which fluid flows;
computing a pressure of the fluid at a position in the pipe network corresponding to the interior node, based on the transfer characteristics and pressures of the fluid at positions in the pipe network corresponding to the plurality of nodes;
deriving the transfer characteristics according to a frequency of a voltage; and
computing, based on the transfer characteristics and a first feature which is a feature of a change of a pressure of the fluid at positions in the pipe network corresponding to the plurality of nodes, a second feature which is a feature of a change of a pressure of the fluid at a position in the pipe network corresponding to the interior node.

5. The analysis method according to claim 4, further comprising:
acquiring a third feature which is a feature of a change of a pressure at the position in the pipe network that corresponds to the interior node; and
calculating a difference between the second feature and the third feature based on the second feature and the third feature.

6. The analysis method according to claim 5, further comprising:
determining whether the difference satisfies predetermined criterion;
performing modification of a predetermined parameter in information of the pipe network based on the difference when the difference is determined not to satisfy the predetermined criterion; and
repeating the modification until the difference calculated based on information of the pipe network to which the modification is applied is determined to satisfy the predetermined criterion.

7. A non-transitory computer-readable storage medium storing a program that causes a computer to perform:
transfer characteristics derivation processing for deriving a transfer characteristics that represents a relation between a voltage at a plurality of nodes included in an electrical circuit and a voltage at an interior node that is a node in the electrical circuit different from the plurality of nodes, the electrical circuit being a modeling of a pipe network in which fluid flows; and computation processing for computing a pressure of the fluid at a position in the pipe network corresponding to the interior node, based on the transfer characteristics and pressures of the fluid at positions in the pipe network corresponding to the plurality of nodes, wherein the transfer characteristics derivation processing includes deriving the transfer characteristics according to a frequency of a voltage, and the computation processing includes computing, based on the transfer characteristics and a first feature which is a feature of a change of a pressure of the fluid at positions in the pipe network corresponding to the plurality of nodes, a second feature which is a feature of a change of a pressure of the fluid at a position in the pipe network corresponding to the interior node.

8. The storage medium according to claim 7, wherein the program further causes the computer to perform:

input/output processing for acquiring a third feature which is a feature of a change of a pressure at the position in the pipe network that corresponds to the interior node; and wave comparison processing for calculating a difference between the second feature and the third feature based on the second feature and the third feature.

9. The storage medium according to claim 8, wherein the program further causes the computer to perform:

determination processing for determining whether the difference satisfies predetermined criterion; and modification processing for performing modification of a predetermined parameter in information of the pipe network based on the difference when the determination processing determines that the difference does not satisfy the predetermined criterion, and the modification processing includes repeating the modification until the determination processing determines that the difference calculated based on information of the pipe network to which the modification is applied satisfies the predetermined criterion.

* * * * *